(12) United States Patent
Tsutsumi

(10) Patent No.: US 7,771,866 B2
(45) Date of Patent: Aug. 10, 2010

(54) BATTERY-LOCKING MECHANISM FOR ELECTRONIC APPARATUS

(75) Inventor: Yuka Tsutsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 10/543,365

(22) PCT Filed: Nov. 26, 2004

(86) PCT No.: PCT/JP2004/017986
§ 371 (c)(1),
(2), (4) Date: Jul. 26, 2005

(87) PCT Pub. No.: WO2005/062402
PCT Pub. Date: Jul. 7, 2005

(65) Prior Publication Data
US 2006/0141343 A1    Jun. 29, 2006

(30) Foreign Application Priority Data
Dec. 24, 2003    (JP) .............................. 2003-427863

(51) Int. Cl.
*H01M 2/10* (2006.01)
(52) U.S. Cl. ............................ 429/96; 429/97; 429/100
(58) Field of Classification Search .................. 429/96, 429/97, 100
See application file for complete search history.

(56) References Cited

U.S. PATENT DOCUMENTS

| | | | |
|---|---|---|---|
| 5,212,021 A | 5/1993 | Smith et al. | |
| 5,306,172 A * | 4/1994 | Inada et al. | 439/299 |
| 5,768,098 A * | 6/1998 | Murayama | 361/679.09 |
| 5,881,823 A | 3/1999 | Kabatnik et al. | |
| 6,261,715 B1 * | 7/2001 | Nakamura et al. | 429/100 |

FOREIGN PATENT DOCUMENTS

| | | |
|---|---|---|
| EP | 1 289 032 A1 | 3/2003 |
| JP | 01-227350 | 9/1989 |
| JP | 6-168742 | 6/1994 |
| JP | 7-143372 | 6/1995 |
| JP | 07-143372 | 6/1995 |
| JP | 07-312214 | 11/1995 |

* cited by examiner

Primary Examiner—Jane Rhee
(74) Attorney, Agent, or Firm—Oblon, Spivak, McClelland, Maier & Neustadt, L.L.P.

(57) ABSTRACT

An arrangement configuration of a battery locking mechanism in an electronic apparatus is taken into consideration to make further downsizing of the electronic apparatus possible. The battery locking mechanism includes a battery mounting section (25) provided on a back surface side of an image pickup apparatus (1) for removably receiving a battery (24) thereon, a locking member (140) disposed along a rear surface side of the battery mounting section (25) and partly projecting to a battery mounting surface of the battery mounting section (25) for engaging with the battery (24) mounted on the battery mounting section (25) to lock the battery (24), and an unlocking member (150) disposed for sliding movement in a direction perpendicular to the battery mounting surface of the battery mounting section (25) for engaging with the locking member (140) to release the locking of the battery (24). The locking member (140) and the unlocking member (150) are disposed in an L shape.

7 Claims, 21 Drawing Sheets

BATTERY-LOCKING MECHANISM FOR ELECTRONIC APPARATUS

TECHNICAL FIELD

This invention relates to a battery locking mechanism for locking a battery serving as a driving power supply for an electronic apparatus in a state wherein the battery is mounted on the electronic apparatus and releasing the locking of the battery.

BACKGROUND ART

Conventionally, as a battery locking mechanism for an electronic apparatus, such a battery locking mechanism as disclosed, for example, in Japanese Patent Laid-Open No. Hei 7-312214 is known.

In particular, according to the battery locking mechanism, a battery is mounted on the back surface side of an electronic apparatus (video camera), and in this state, the battery is engaged and locked by a locking member which projects on the battery mounting surface. Further, the battery locking mechanism is structured such that an unlocking mechanism of the pushbutton type is provided alongside the locking member, and when the unlocking member is depressed, the locking member is disengaged from the battery, and consequently, the locking of the battery is released and the battery can be removed from the electronic apparatus.

Since the battery locking mechanism disclosed in Japanese Patent Laid-Open No. Hei 7-312214 is configured such that the unlocking member of the pushbutton type is disposed alongside the locking member, a large space is required for the arrangement of the mechanism. In recent years, further downsizing of electronic apparatus has been and is proceeding, and reducing the space of the internal structure is demanded. However, the battery locking mechanism disclosed in Japanese Patent Laid-Open No. Hei 7-312214 cannot satisfy the demand.

The present invention has been made in view of such a point of view as just described, and it is an object of the present invention to make further downsizing of an electronic apparatus taking an arrangement configuration of a battery locking mechanism of the electronic apparatus into consideration.

DISCLOSURE OF INVENTION

In order to attain the object described above, according to the present invention, a battery locking mechanism for an electronic apparatus includes a battery mounting section provided on a back surface side of the electronic apparatus for removably mounting a battery thereon, a locking member disposed along a rear surface side of the battery mounting section and partly projecting to a battery mounting surface of the battery mounting section for engaging with the battery mounted on the battery mounting section to lock the battery, and an unlocking member slidably disposed in a direction perpendicular to the battery mounting surface of the battery mounting section for engaging with the locking member to release the locking of the battery, the locking member and the unlocking member being disposed in an L shape.

The battery locking mechanism of the present invention further includes a slide lock member for restricting the sliding movement of the unlocking member. In this instance, the slide lock member is carried on the unlocking member.

Further, according to the present invention, the battery mounting section is provided on a panel which forms part of an outer case of the electronic apparatus, and the locking member and the unlocking member are assembled to the panel.

According to the present invention, since the locking member and the unlocking member are disposed in an L shape, it is possible to dispose the battery locking mechanism in a small gap between the outer case of the electronic apparatus and an internal structure section. Therefore, the present invention has an effect that it can contribute much to further downsizing of the electronic apparatus.

Further, according to the present invention, since the battery locking mechanism includes the slide lock member for restricting the sliding movement of the unlocking member, there is an effect that the locking of the battery can be prevented from being released in error. Further, where the slide lock member is carried on the unlocking member, minimization of the space can be anticipated, and consequently, there is an advantage that the present invention is advantageous to downsizing of the electronic apparatus.

Furthermore, since the locking member and the unlocking member are assembled to the panel which forms part of the outer case of the electronic apparatus, when the electronic apparatus is to be assembled, by assembling the locking member and the unlocking member to the panel in advance and then attaching the panel to the outer case of the electronic apparatus, there is an effect that the assembly efficiency can be enhanced.

BEST MODE FOR CARRYING OUT THE INVENTION

In the following, an embodiment of the present invention is described in detail with reference to the drawings.

Figure 6:
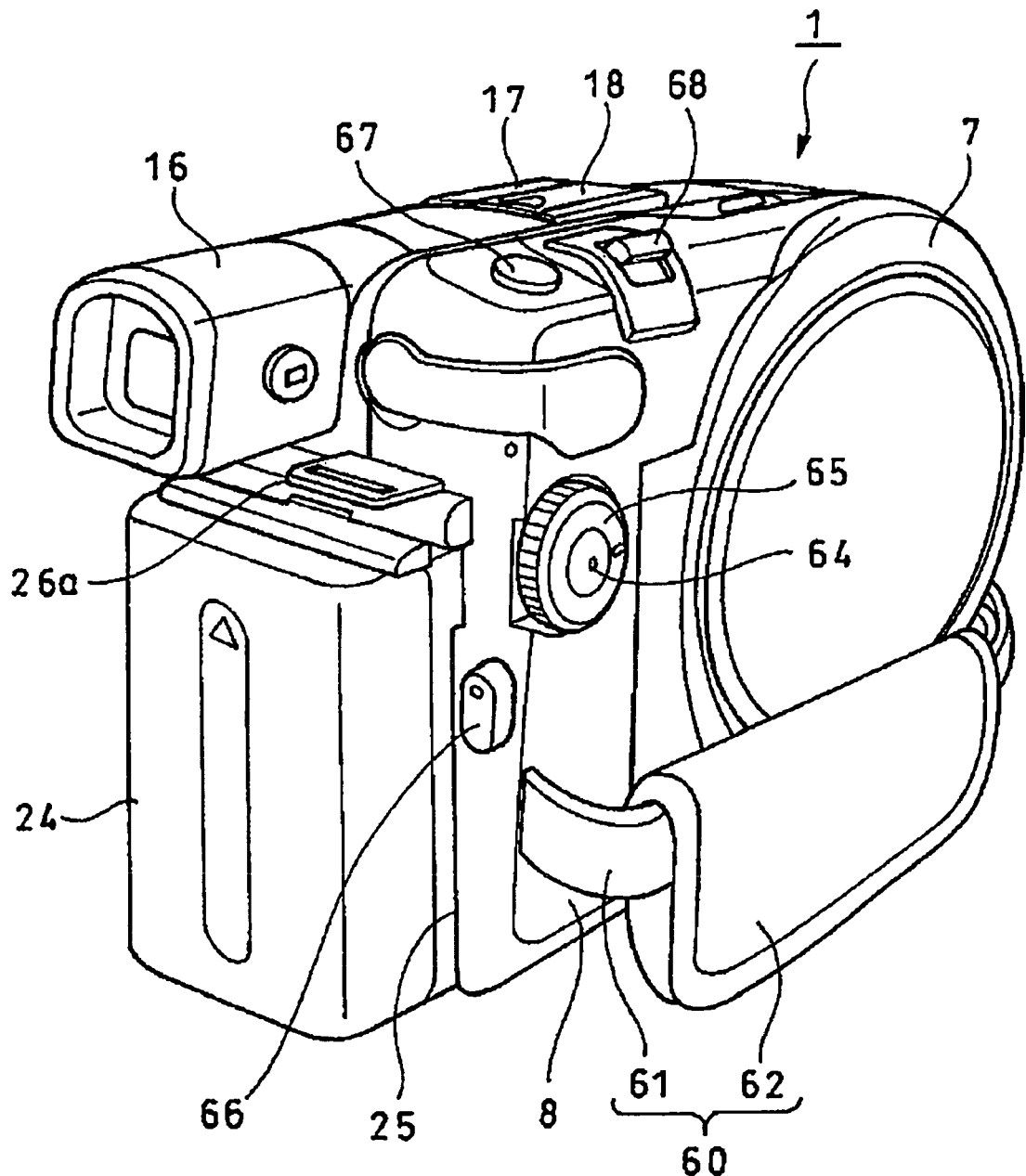
FIG. 6 is a perspective view of the image pickup apparatus with a battery mounted as viewed from the back surface side.
Figure 7:
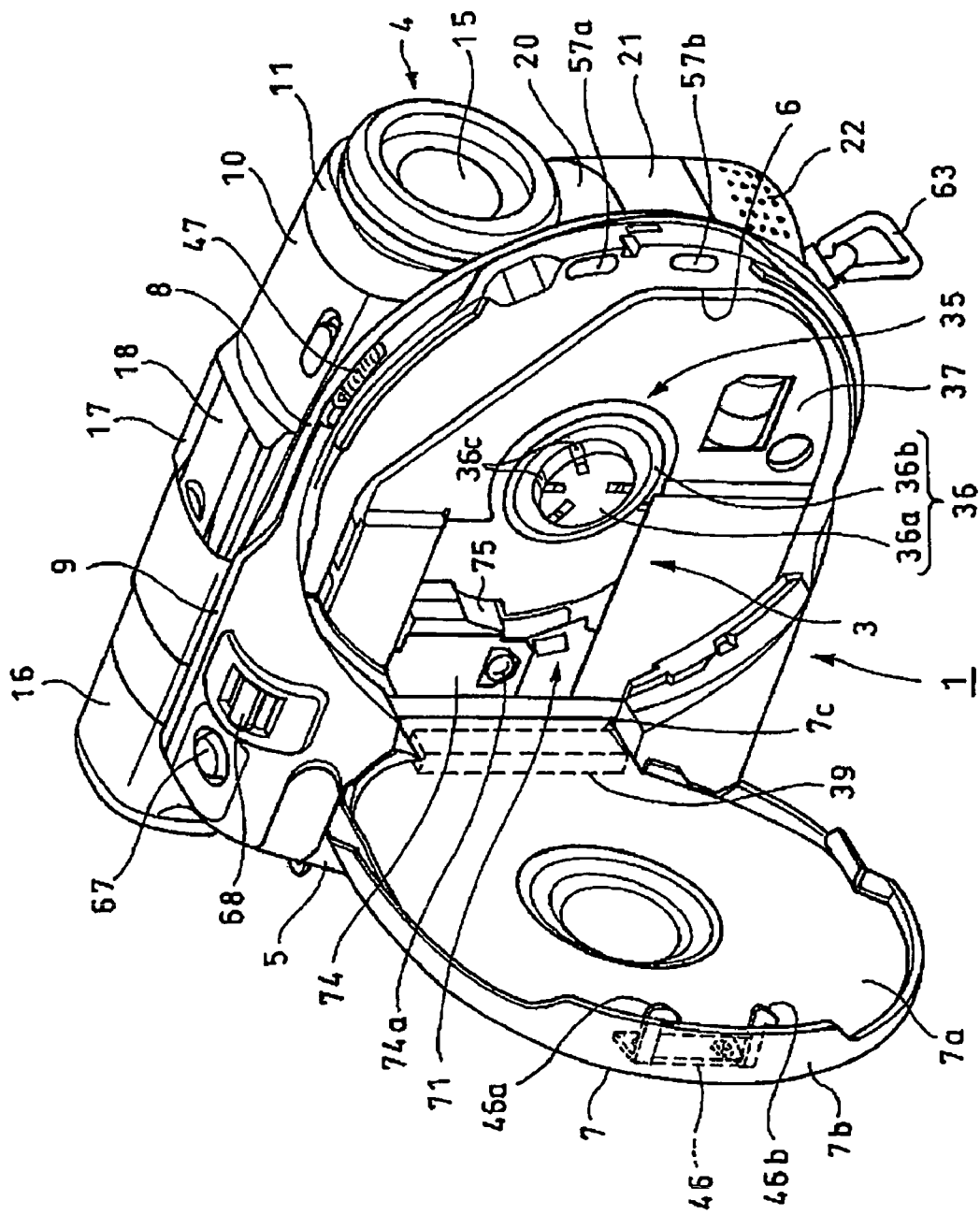
FIG. 7 is a perspective view of the image pickup apparatus with a disk lid opened as viewed from the front surface side.
Figure 8:
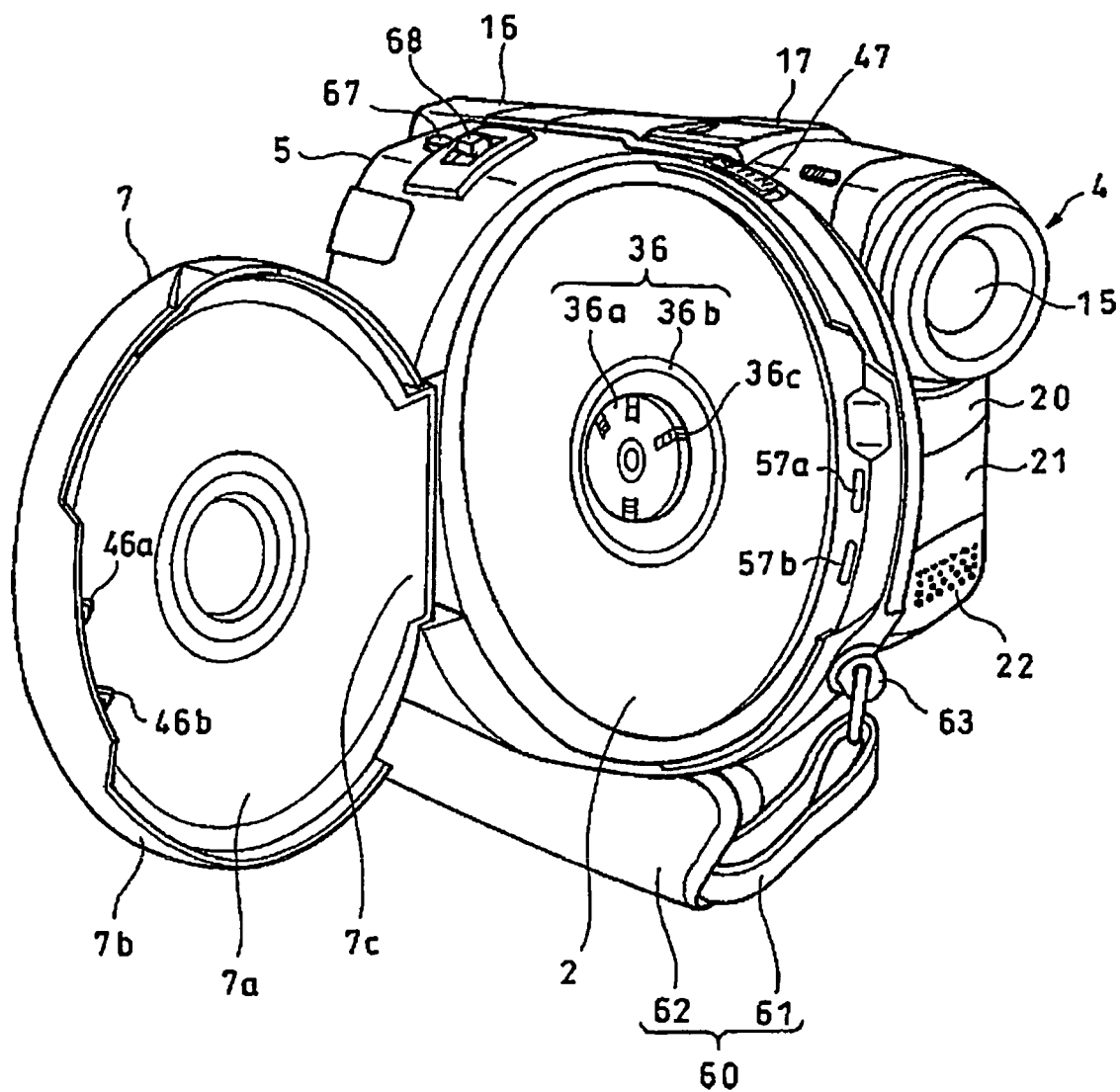
FIG. 8 is a perspective view of the image pickup apparatus in a state wherein a disk type recording medium is mounted.
Figure 9:
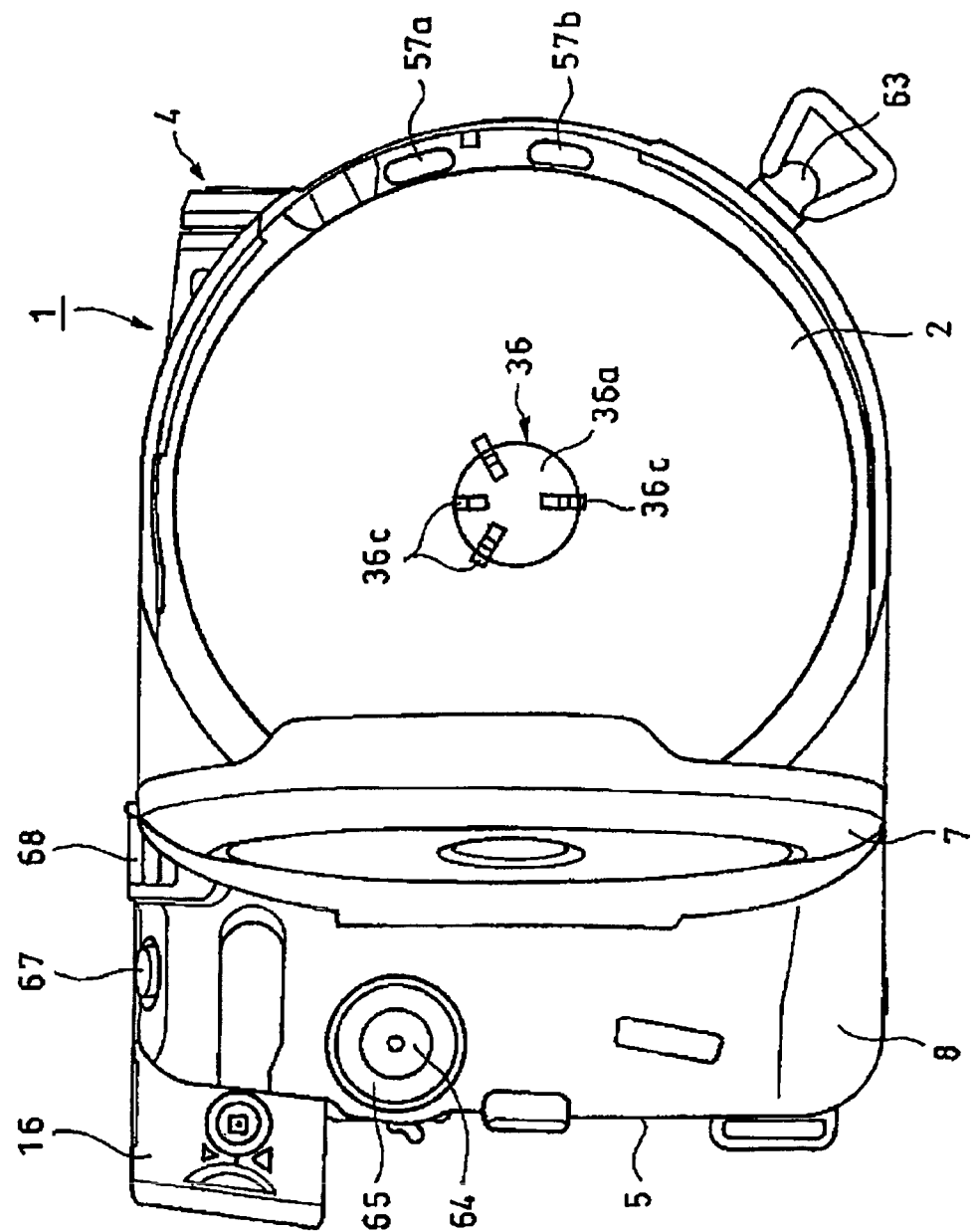
FIG. 9 is a side elevational view of the image pickup apparatus with the disk lid opened.
Figure 10:
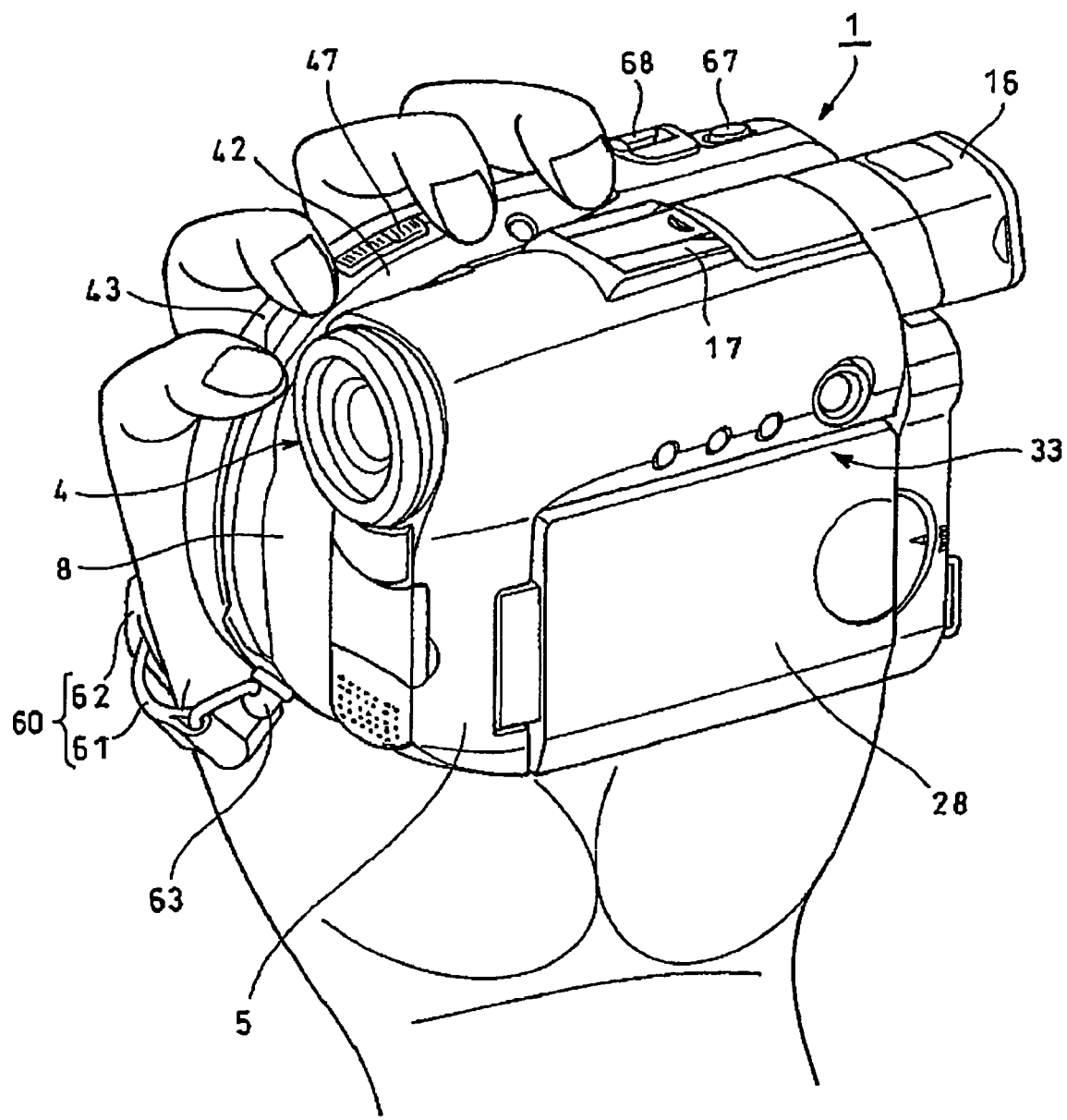
FIG. 10 is a schematic view showing the image pickup apparatus in a use state wherein a grip portion is gripped.

First, a configuration of an image pickup apparatus as an electronic apparatus to which the present invention is applied is described. FIGS. 1 to 4 are a perspective view, a front elevational view, a plan view and a side elevational view, respectively, showing an embodiment of the image pickup apparatus; FIG. 5 is a perspective view of the image pickup apparatus with a display apparatus opened as viewed from rearwardly; FIG. 6 is a perspective view of the image pickup apparatus as viewed from rearwardly of the disk side; FIG. 7 is a perspective view of the image pickup apparatus with a disk lid opened as viewed from forwardly; FIG. 8 is a perspective view of the image pickup apparatus with a disk type recording medium mounted; FIG. 9 is a side elevational view of the image pickup apparatus; and FIG. 10 is a schematic view showing the image pickup apparatus in a gripped state.

The image pickup apparatus 1 uses, as a particular example of a disk type recording medium which is an information storage medium, a DVD (Digital Versatile Disc) of a diameter of 8 cm. The image pickup apparatus 1 can convert an optical image into an electric signal by means of a CCD apparatus (solid-state image pickup device) and record the signal on the DVD and display the signal on a display apparatus such as a liquid crystal monitor (the image pickup apparatus is hereinafter referred to as "disk type image pickup apparatus"). However, the disk type recording medium in the present invention is not limited to the DVD, but naturally a CD-ROM or some other recordable optical disk can be used. Also a disk type recording medium of a different recording system such as, for example, a magneto-optical disk or a magnetic disk can be applied.

The disk type image pickup apparatus 1 includes a disk drive apparatus 3 (refer to FIGS. 7 to 9) which drives a DVD 2 removably mounted thereon to rotate to perform recording (writing) and reproduction (reading out) of an information signal. The disk type image pickup apparatus 1 further includes a control circuit not shown which performs driving control of the disk drive apparatus 3 and so forth, and a lens apparatus 4 for fetching an image of an image pickup subject as light and introducing the light to the CCD apparatus. The disk type image pickup apparatus 1 further includes an outer case 5 in which the disk drive apparatus 3 and so forth are accommodated, a disk lid 7 attached for pivotal motion to the outer case 5 for covering a disk accommodating section 6 so as to open and close the disk accommodating section 6, and so forth.

The outer case 5 includes a disk side panel 8, a central panel 9 and a display apparatus side panel 10 combined so as to be placed one on another triply, a front panel 11 and a battery mounting panel 12 disposed forwardly and rearwardly in the direction of an optical axis of the lens apparatus 4 and combined with the panels 8 to 10, and a partition panel disposed on the inner side of the central panel 9 but not appearing in the figures. A hollow housing is formed from the panels 8 to 12. The disk drive apparatus 3 is supported resiliently on a surface of the partition wall on the disk side panel 8 side through four mount insulators provided at different locations. The panels 8 to 12 are configured for assembly and disassembly by means of fixing elements each formed from a fixing screw at suitable portions at which the panels 8 to 12 are placed one on another or through some other members.

The lens apparatus 4 is fixed in a state wherein it is built in an upper portion of the outer case 5, and an objective lens 15 thereof extends forwardly through an upper portion of the front panel 11 and is exposed to a front surface of the front panel 11. Though not shown, a CCD apparatus is disposed rearwardly of the lens apparatus 4 in the inside of the outer case 5, and a viewfinder 16 is disposed rearwardly of the CCD apparatus.

The viewfinder 16 is exposed to an upper portion of the outer case 5 and is mounted for back and forth movement by a predetermined distance in the direction of the optical axis of the lens apparatus 4 by a viewfinder moving mechanism. The viewfinder 16 is configured such that it can be pivoted at the rear side thereof in upward and downward directions around the center of pivotal motion on the front side thereof. Consequently, the viewfinder 16 can be adjusted in angle to an arbitrary angle within a predetermined angular range (in the present embodiment, approximately 90 degrees) from a horizontal state wherein it extends in parallel to the optical axis of the lens apparatus 4 to an upright state wherein the rear portion is erected uprightly. The angular adjustment of the viewfinder 16 can be performed at any position from a front end portion to a rear end portion of the viewfinder moving mechanism.

Further, an accessory shoe 17 on which an accessory such as a video light and an externally provided microphone is removably mounted is attached to an upper portion of the outer case 5. The accessory shoe 17 is disposed immediately forwardly of the viewfinder 16, and when the viewfinder 16 is moved rearwardly, an insertion entrance into the accessory shoe 17 is opened. In a state wherein the insertion entrance is open, an accessory can be mounted, and if the viewfinder 16 is moved forwardly after an accessory is mounted, then the insertion entrance is closed to disable removal of the accessory. On the accessory shoe 17, usually a shoe cap 18 serving as a lid member for filling up the space portion when the accessory shoe 17 is not used is mounted.

Further, a remote controller light receiving section 20 and a built-in microphone 22 of the stereo system are disposed in order from above on the front surface of the front panel 11. The remote controller light receiving section 20 is a reception section for a remote control operation. The remote controller light receiving section 20 serves also as an infrared ray emitting section for emitting infrared rays used for automatic adjustment of the focus and so forth. Meanwhile, the microphone terminal includes a video terminal and an audio terminal, and the terminals mentioned are covered so as to open and closed with a terminal cover 21.

As shown in FIGS. 5 and 6, a battery mounting section 25 on which a battery 24 which is a driving power supply for the image pickup apparatus is to be removably mounted is provided on the battery mounting panel 12 which forms part of the outer case 5. The battery mounting section 25 is open to the back surface and the lower surface of the battery mounting panel 12 such that the battery 24 can be inserted from below into and mounted on the battery mounting section 25 and can be removed in the same direction. Further, two supporting metal members 26a and 26b for a suspending strap are attached to the battery mounting panel 12. Of the two supporting metal members 26a and 26b, the supporting metal member 26a is disposed at an upper portion of the right side while the other supporting metal member 26b is disposed at a lower portion of the left side.

Figure 4:
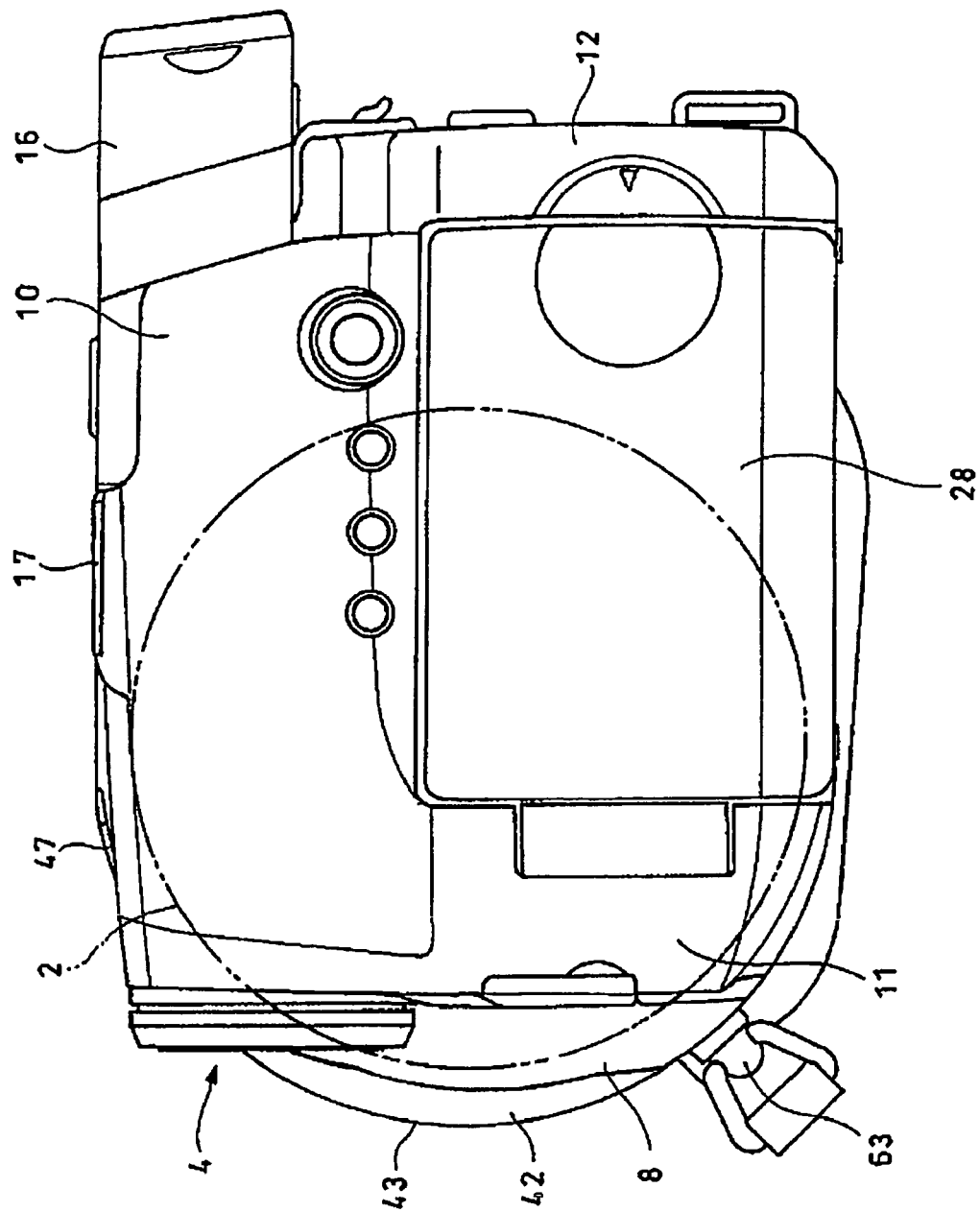
FIG. 4 is a side elevational view showing the image pickup apparatus.
Figure 5:
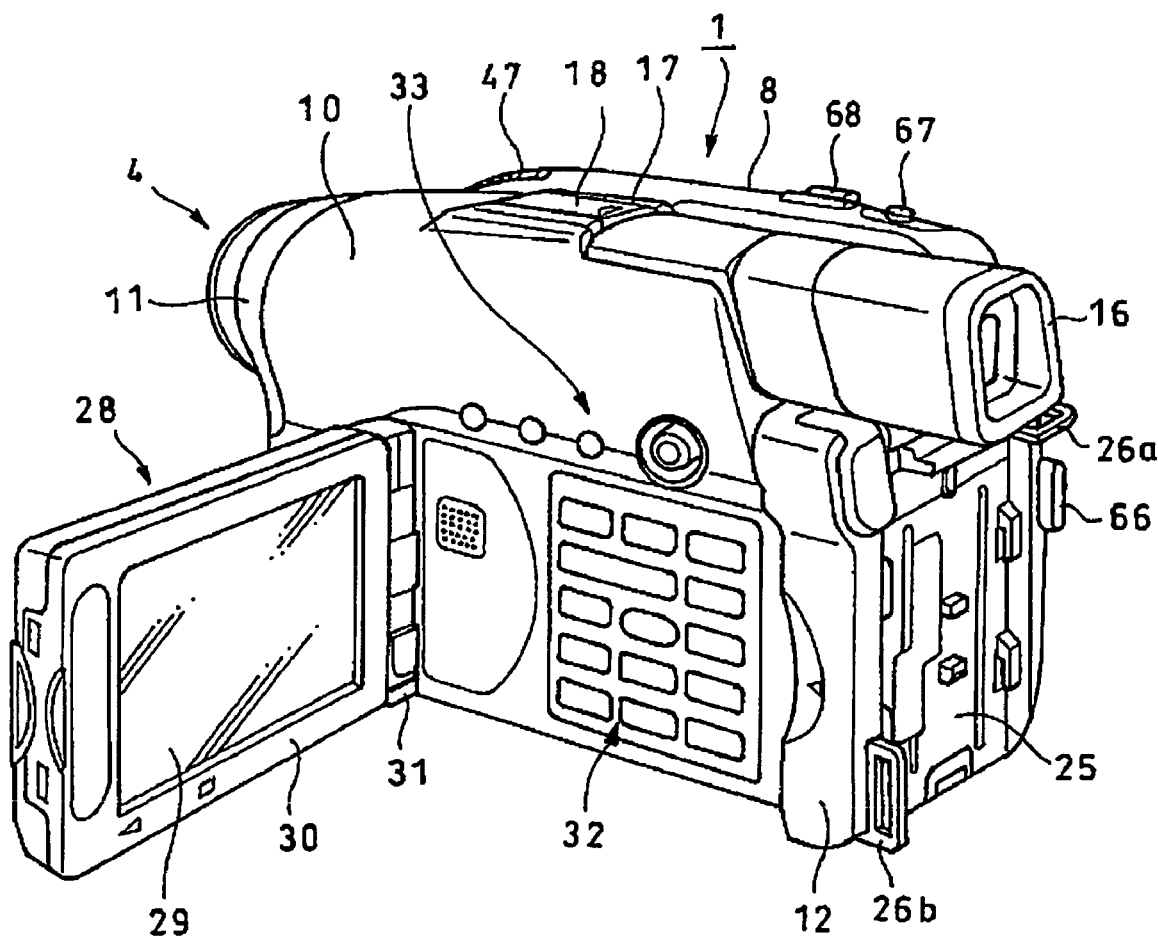
FIG. 5 is a perspective view of the image pickup apparatus with a display apparatus opened sidewardly as viewed from the back surface side.

As shown in FIGS. 4 and 5, a display apparatus 28 is attached for adjustment in posture thereof to the display apparatus side panel 10 of the outer case 5. The display apparatus 28 includes a liquid crystal monitor 29 in the form of a flat plate, a panel case 30 in which the liquid crystal monitor 29 is accommodated, and a panel supporting section 31 for supporting the panel case 30 for adjustment in posture with respect to the outer case 5.

The panel supporting section 31 has a horizontally pivoting function of permitting the panel case 30 to pivot by approximately 90 degrees in a horizontal direction around a vertical axis and a forwardly and backwardly pivoting function of permitting the panel case 30 to pivot by approximately 180 degrees in the forward and backward directions around a horizontal axis. Consequently, the display apparatus 28 can arbitrarily assume one of an accommodation state shown in FIGS. 1 to 4, another state wherein the panel case 30 shown in FIG. 5 is pivoted by 90 degrees so that the liquid crystal monitor 29 is opposed rearwardly, a further state wherein the panel case 30 is pivoted by 180 degrees from the state of FIG. 5 until the liquid crystal monitor 29 is opposed forwardly, and states of intermediate positions between the states.

Further, the display apparatus side panel 10 has provided thereon an inner side operation section 32 formed from a large number of operation buttons covered with the panel case 30 so as to be opened and closed, and an outer side operation section 33 formed from a plurality of operation buttons disposed above the panel case 30.

The disk accommodating section 6 is formed from a fixed region having an opening for exposing part of the disk drive apparatus 3 and is formed, in the present embodiment, as a region of a size corresponding to a disk type recording medium having a diameter of 8 cm. A table rotating apparatus 35 of the disk drive apparatus 3 is disposed at a substantially central portion of the disk accommodating section 6, and a DVD 2 having a diameter of 8 cm, which indicates a particular example of a disk type recording medium, can be mounted on a turntable 36 positioned at a central location of the table rotating apparatus 35.

The disk accommodating section 6 in which the table rotating apparatus 35 is disposed is covered with the disk lid 7 which is supported at a side surface portion thereof for pivotal motion on the disk side panel 8 such that it can be opened and closed. The disk lid 7 has a shape complementary to the shape of the disk accommodating section 6 and has a flat surface portion 7a which covers the opening side of the disk accommodating section 6 and a circumferential portion 7b continuous over a substantially overall circumference of an outer circumferential edge of the flat surface portion 7a. The circumferential portion 7b of the disk lid 7 is configured for fitting with an outer circumference side recessed portion of the disk accommodating section 6 of the disk side panel 8.

The disk lid 7 shown in the present embodiment has a shape of a shell having an outer circumferential edge which has a circular shape over approximately 5/6 (approximately 300 degrees) the overall circumference thereof (the circular portion may be approximately 3/4 or more the overall circumference), and the remaining portion is formed as a rectangular portion 7c defined by straight lines. A lid pivot portion 39 serving as the center of pivotal motion for allowing the disk lid 7 to be opened and closed is attached to the rectangular portion 7c. The lid pivot portion 39 is formed from, though not shown, a support shaft extending through the rectangular portion 7c and a bearing member having a pair of bearing pieces for fixedly supporting the opposite ends of the support shaft. The bearing member is fixed to the disk side panel 8 to support the disk lid 7 for pivotal motion. The lid pivot portion 39 has a stopper portion provided thereon for setting a maximum opening angle (for example, 90 degrees) of the disk lid 7.

Such a lid pivot portion 39 as described above is attached to the disk side panel 8 such that the axial direction of a support shaft therefor is set to the upward and downward direction. Consequently, the disk lid 7 is supported for pivotal motion at a rear portion of the disk side panel 8 through the lid pivot portion 39. As a result, the disk lid 7 can make an opening movement sidewardly by approximately 90 degrees with the front surface of the disk type image pickup apparatus 1 set to the front side. It is to be noted that a spring member is mounted on the lid pivot portion 39 which can stationarily stop the disk lid 7 at an arbitrary open position within a fixed range of the opening angle and biases the disk lid 7 toward the opening side when the opening angle is exceeded.

A constricted portion 42 is set at a portion, which ranges from a substantially central portion of an upper surface portion to a lower portion of a front surface portion, of the central panel 9 overlapping with the disk side panel 8 by forming the portion so as to be inclined to the display apparatus side panel 10 side which is the inner side to form a concave portion. A grip section 43 for being gripped to hold the disk type image pickup apparatus 1 is formed from the disk side panel 8 having the constricted portion 42 and a portion of the central panel 9 having an arcuate shape.

A lid opening/closing mechanism for the disk lid 7 is provided between such a central panel 9 and a disk side panel 8 as described above. The lid opening/closing mechanism has a function of locking the disk lid 7, which is in a state wherein the disk accommodating section 6 is closed, in the closed state and another function of releasing the locking.

Figure 1:
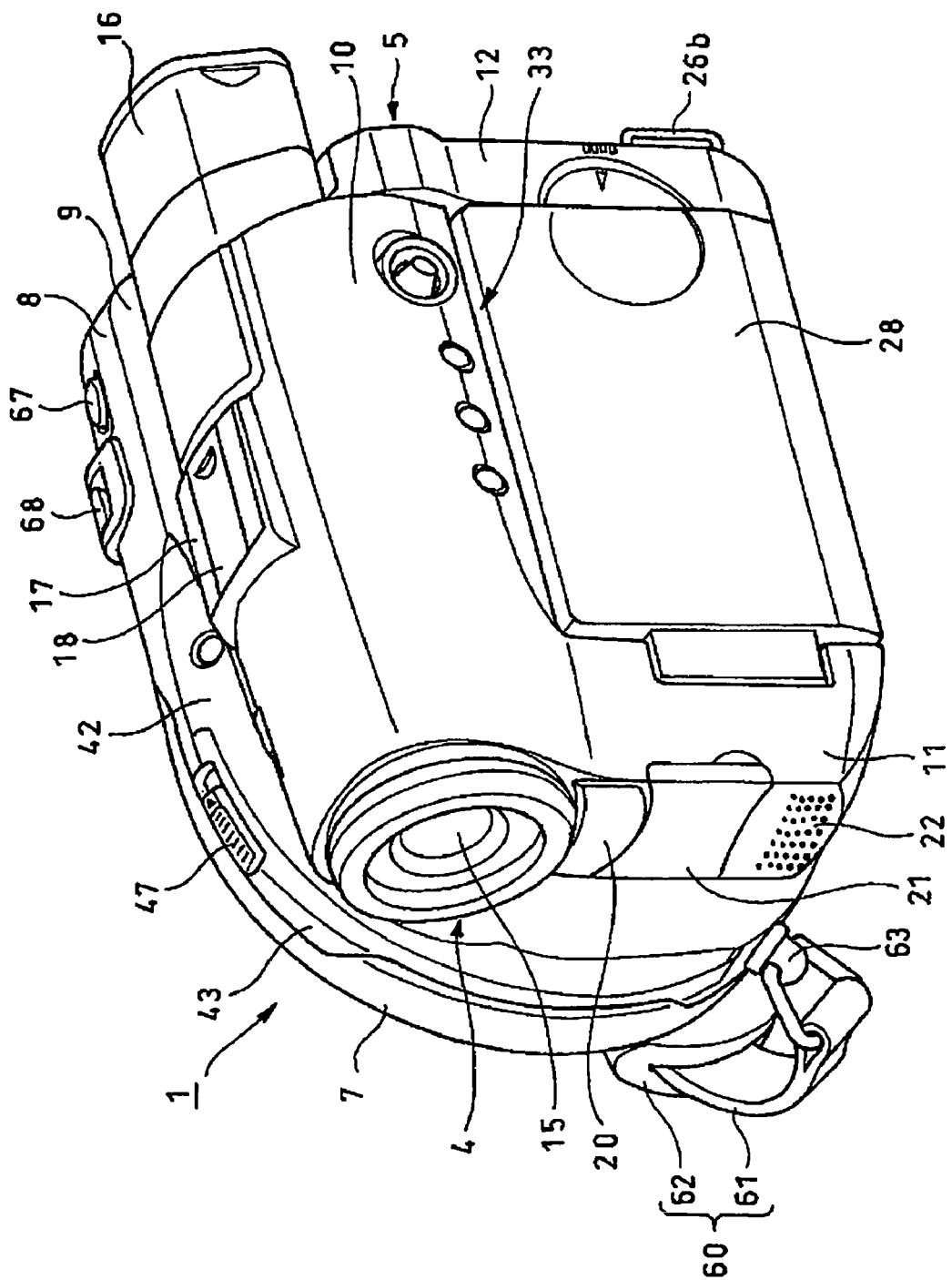
FIG. 1 is a perspective view showing an image pickup apparatus.
Figure 2:
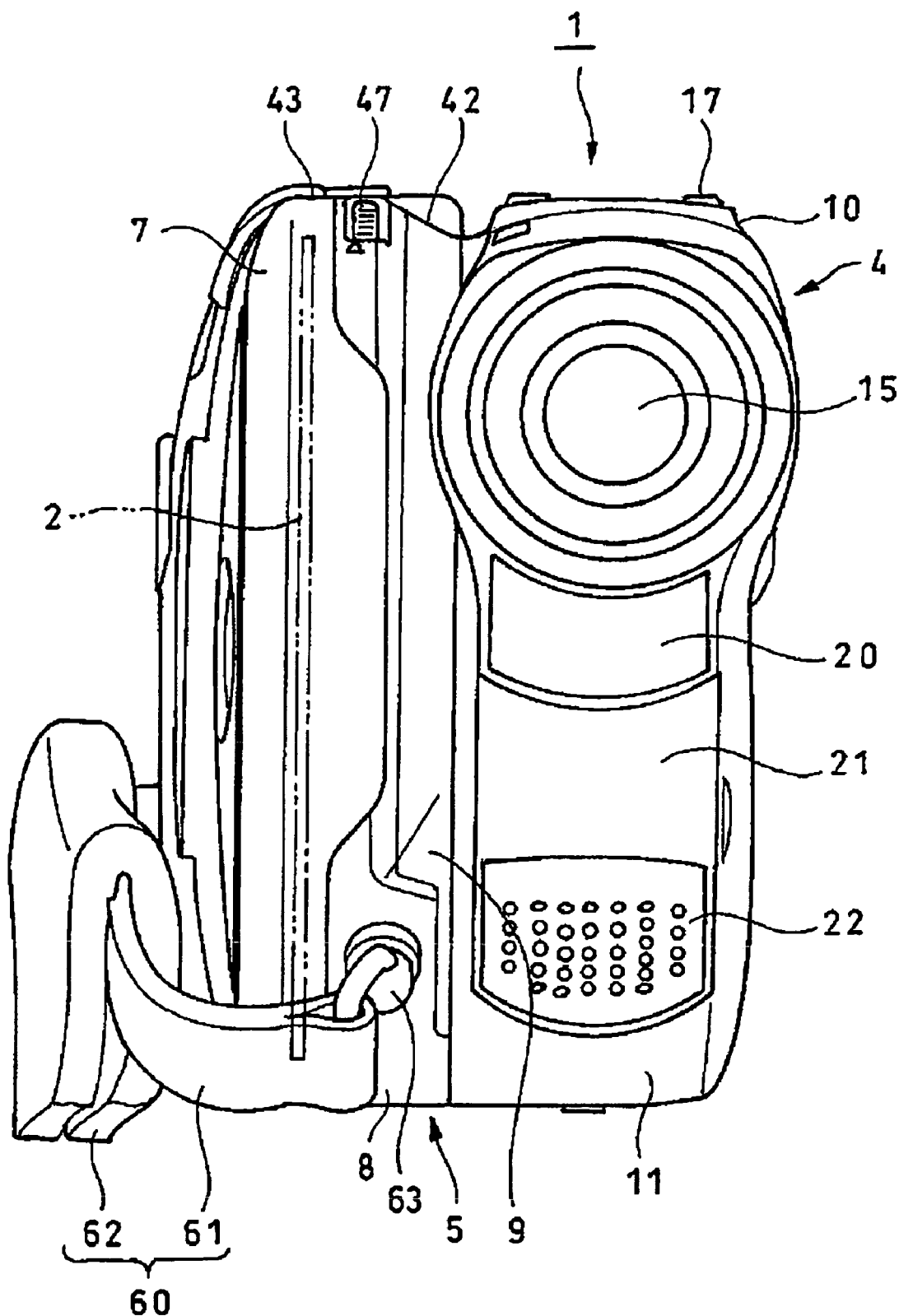
FIG. 2 is a front elevational view showing the image pickup apparatus.
Figure 3:
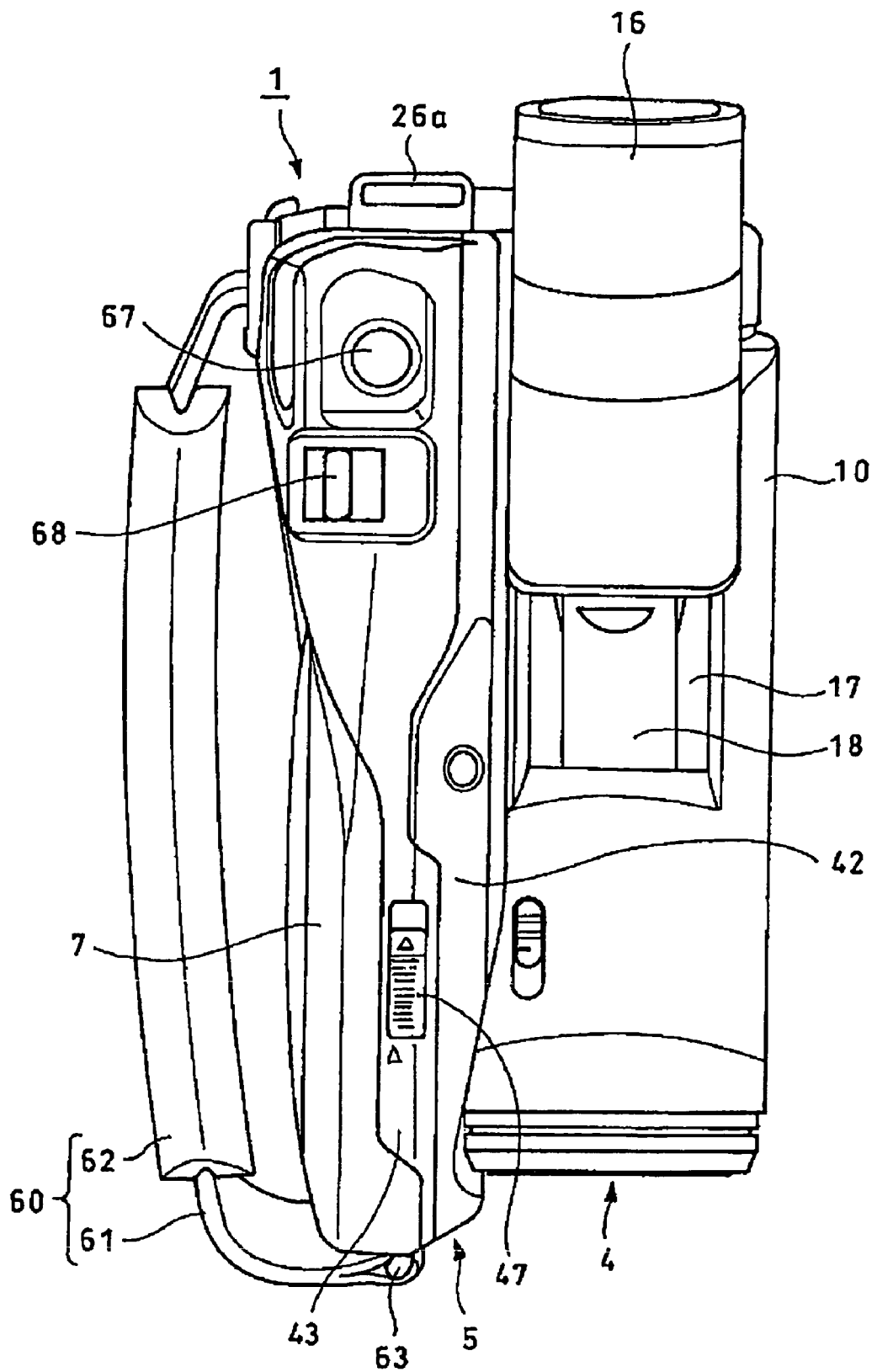
FIG. 3 is a plan view showing the image pickup apparatus.

Further, a hand strap 60 is attached to the disk side panel 8 in such a manner as to surround the disk lid 7 as shown in FIGS. 3, 6 and so forth. The hand strap 60 supports a portion of a hand of a user gripping the grip section 43 serving as a gripping section of the outer case 5 to prevent dropping and so forth of the disk type image pickup apparatus 1.

The hand strap 60 includes a support belt 61 fixed at the opposite ends thereof to the disk side panel 8, and a protective pad 62 mounted on the support belt 61 for being contacted with the back portion of a hand of a user. The support belt 61 is connected at one end thereof to an attaching metal member 63 fixed to a lower portion of the front side of the disk side panel 8 and is inserted at the other end thereof in the inside of the disk side panel 8 through a through-hole provided at an intermediate portion of the rear side of the disk side panel 8 and secured to an attaching metal member attached to the inside of the disk side panel 8.

As shown in FIG. 6 and so forth, a power supply button 64, a mode changeover dial 65 and a recording button 66 are disposed at a rear portion of the disk side panel 8. The mode changeover dial 65 has a ring shape, and the power supply button 64 is accommodated in a hole of the mode changeover dial 65. The power supply button 64 is formed from switch means of the push-push type, and power supply from the battery 24 is turned on and off by a pushing operation of the power supply button 64. The mode changeover dial 65 is provided to select an operation mode of recording or the like, and an arbitrary mode can be selected from among three modes of a "still picture mode", a "moving picture mode" and a "watching-editing mode" by a pivoting operation of the mode changeover dial 65. Further, the recording button 66 is formed from switch means of the push-push type, and starting and stopping of image pickup of moving pictures are repeated by pushing operations of the recording button 66.

Further, a shutter button 67 and a zoom lever 68 are disposed at an upper portion of the rear side of the disk side panel 8. The shutter button 67 is provided to pick up a still picture, and by a pushing operation, a still picture is picked up by each pushing operation. Further, the zoom lever 68 is provided to expand an image upon image pickup, reproduction or the like, and the magnification can be adjusted steplessly within a fixed range in response to the operation amount of the zoom lever 68.

As described hereinabove, the inside of the outer case 5 is partitioned in the leftward and rightward direction (direction perpendicular to the optical axis of the lens apparatus 4) by a partition panel thereby to form a first chamber on the disk lid 7 side and a second chamber on the display apparatus side. The partition panel is formed from a member in the form of a plate and is fixedly fastened in the inside of the outer case 5 by fastening screws.

Though not shown, the disk drive apparatus 3 is accommodated in the first chamber of the outer case 5, and the lens apparatus 4, control circuit section and so forth are accommodated in the second chamber. To this end, a plurality of supporting projections for supporting the disk drive apparatus 3 are provided on one surface side of the partition panel while a plurality of supporting pieces for supporting the lens apparatus 4, a printed circuit board and so forth are provided on the other surface side of the partition panel. The circuit control section is formed from, for example, a microcomputer, a storage apparatus (RAM, ROM), capacitors, resistors and other electronic parts, circuit boards on which the electronic parts are mounted and so forth.

As seen in FIG. 7, the disk drive apparatus 3 includes a mechanism chassis 37 attached to the partition panel, a table rotating apparatus 35 fixed to the mechanism chassis 37, an optical pickup apparatus 71 indicating a particular example of a pickup apparatus, and so forth. The mechanism chassis 37 is formed from a conductive plate member and is resiliently supported on the partition panel through a plurality of mount insulators each formed from an insulating material and made of a resilient member.

The mechanism chassis 37 attached to the partition panel in this manner is formed from a member in the form of a framework having a sufficiently high strength. Conductor portions of the mechanism chassis 37 and the partition panel are electrically connected to each other by a grounding member not shown so as to facilitate discharging of static electricity or the like to the outside. The table rotating apparatus 35 mounted on the mechanism chassis 37 includes a spindle motor secured to the mechanism chassis 37, and a turntable 36 secured to a rotary portion of the spindle motor.

The turntable 36 includes a fitting portion 36a for being fitted into a center hole of the DVD 2, and a receiving portion 36b for receiving a circumferential edge portion of the center hole. Further, a plurality of engaging pawls 36c for engaging with the circumferential edge portion of the center hole of the DVD 2 to hold the DVD 2 are provided in a circumferential direction on the fitting portion 36a of the turntable 36. Each of the engaging pawls 36c is biased to the outer side in a radial direction by a spring so that the DVD 2 is positioned at the fitting portion 36a by the spring force of the springs.

The optical pickup apparatus 71 includes a biaxial actuator 74 having a pickup lens 74a opposing to the information recording surface of the DVD 2, a slide member 75 on which the biaxial actuator 74 is mounted, and so forth. The slide member 75 is mounted for movement under the guidance of two guide shafts not shown in the figure. The two guide shafts extend in parallel to each other with the spindle motor positioned therebetween, and a pickup moving apparatus is provided in the proximity of one of the guide shafts.

Though not shown, the pickup moving apparatus includes a feed screw shaft held in engagement with a feed nut attached to the slide member 75, and a feed motor having a rotary shaft used as the feed screw shaft. The feed screw shaft is set in parallel to the guide shafts for the optical pickup apparatus 71 and supported for rotation on the mechanism chassis 37. Thus, if the feed motor is driven to rotate the feed screw shaft, then the optical pickup apparatus 71 is selectively moved in a direction in which it moves toward the turntable 36 or another direction in which it moves away from the turntable 36 in response to the direction of rotation of the feed screw shaft. The disk drive apparatus 3 is formed from the mechanism chassis 37, table rotating apparatus 35, optical pickup apparatus 71, pickup moving apparatus and other associated mechanism.

By securing the partition panel, to which the disk drive apparatus 3 having such a configuration as described above is attached, to a predetermined position in the outer case 5, the turntable 36 of the table rotating apparatus 35 and peripheral elements are disposed in the disk accommodating section 6 of the disk side panel 8 as shown in FIG. 7. The disk accommodating section 6 is opened or closed by the disk lid 7, and locking and unlocking of the disk lid 7 are performed by the lid opening/closing mechanism.

The lid opening/closing mechanism includes, as shown in FIG. 7, a locking member 46 secured to the disk lid 7, an operation member 47 attached for sliding movement to a base plate which is a member on the disk side panel 8 side, and so forth. The locking member 46 includes a pair of locking pawls 46a and 46b, and when the disk lid 7 is closed, it is locked in a state wherein the locking pawls 46a and 46b are inserted in insertion holes 57a and 57b formed in a front surface portion of the disk side panel 8. This locking of the disk lid 7 is released by operating the operation member 47 to slidably move.

In this manner, according to the disk type image pickup apparatus 1 wherein the disk lid 7 is opened and closed, the disk type image pickup apparatus 1 can be gripped firmly by one hand and pick up an image of an image pickup subject, for example, in such a state as seen in FIG. 10. In this instance, portions of the disk side panel 8 and the disk lid 7 of the outer case 5 serve as they are as a gripping section for gripping the disk type image pickup apparatus 1, and besides, since the substantially entire gripping section is formed substantially in a circular shape, stable image pickup can be performed using the large grip section 43.

Further, since the constricted portion 42 is set on the inner side of the grip section 43, by gripping the grip section 43 such that the constricted portion 42 is held by end portions of the fingers from the forefinger to the little finger, sufficiently high gripping force can be exerted. Furthermore, since the lid opening/closing mechanism 45 is accommodated in the space region set on the inner side of the grip section 43, the space region in the outer case 5 can be utilized wastelessly. Therefore, by eliminating a free space in the outer case 5, downsizing of the outer case 5 can be anticipated, and as a result, miniaturization of the overall apparatus can be anticipated.

Figure 11:
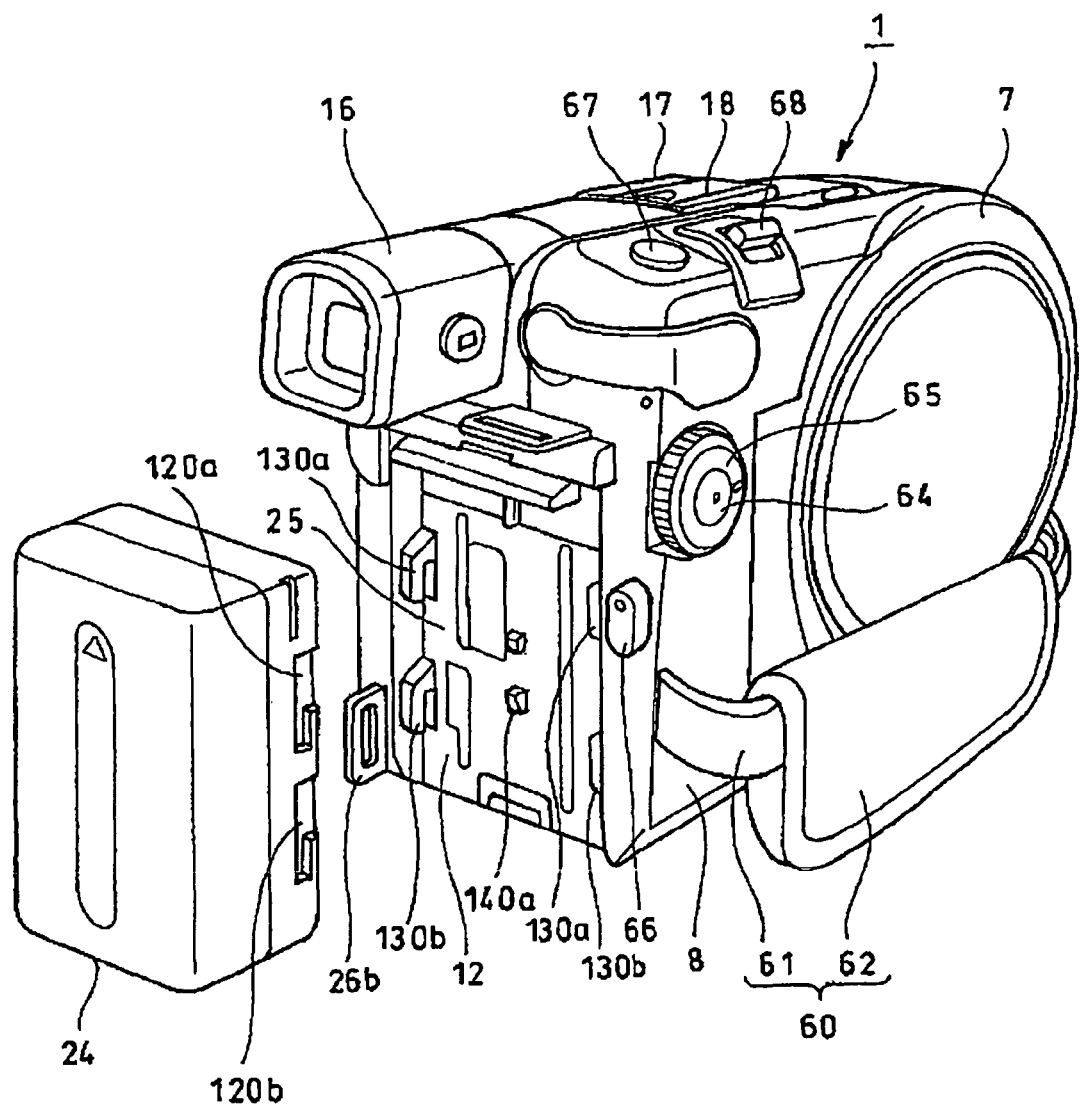
FIG. 11 is a perspective view of the image pickup apparatus with the battery removed as viewed from the surface side.
Figure 12:
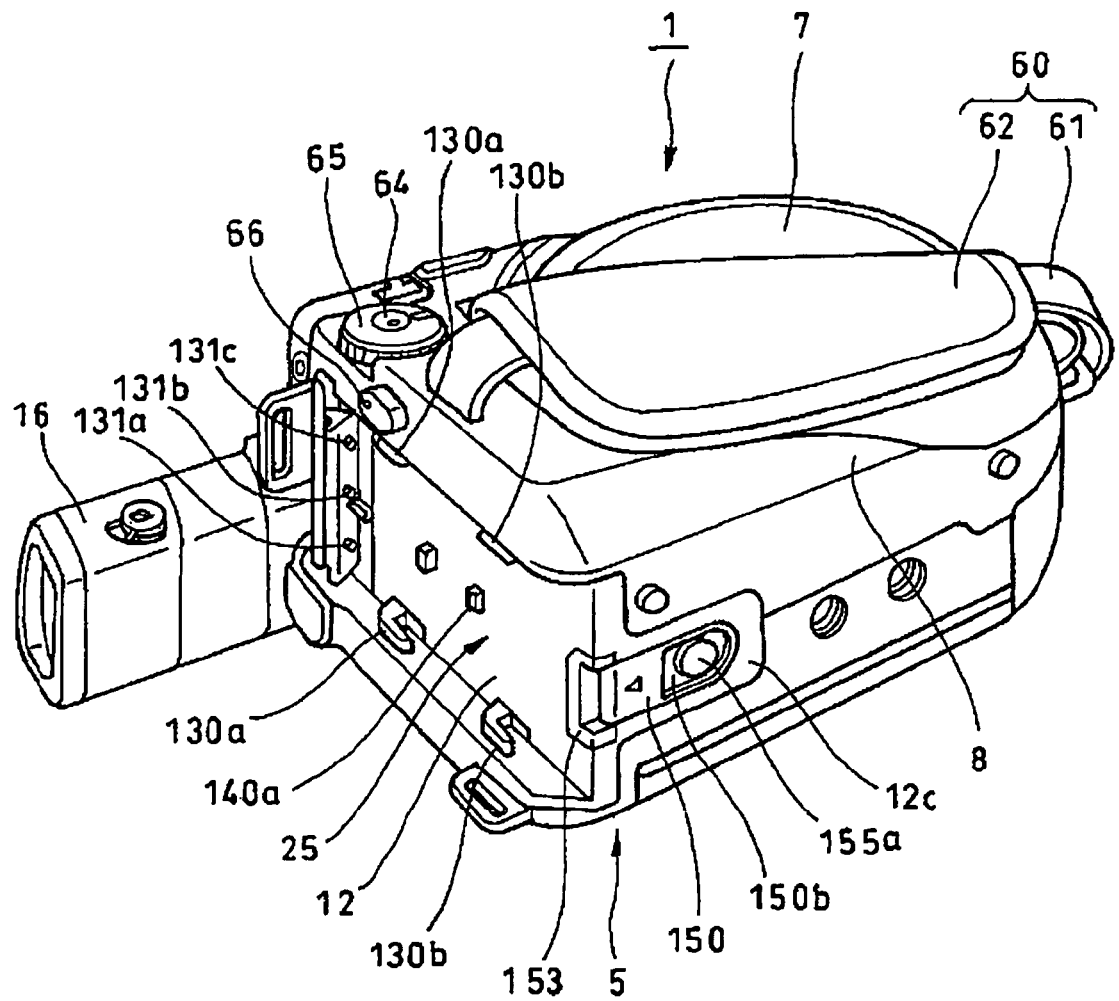
FIG. 12 is a perspective view of the image pickup apparatus in a horizontal lying state with the battery removed as viewed from the bottom surface side.
Figure 13:
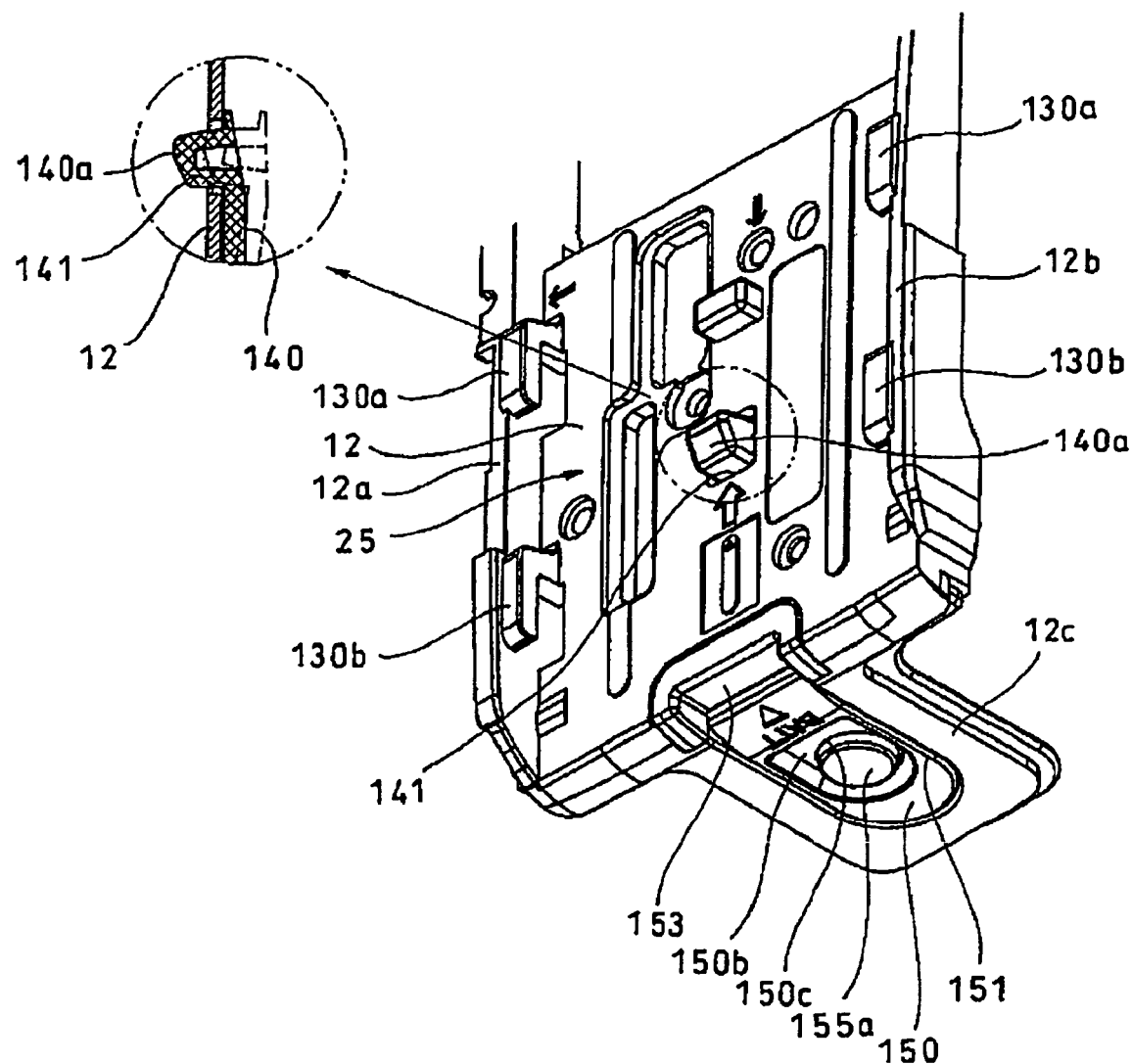
FIG. 13 is a perspective view of a battery locking mechanism as viewed from below.
Figure 14:
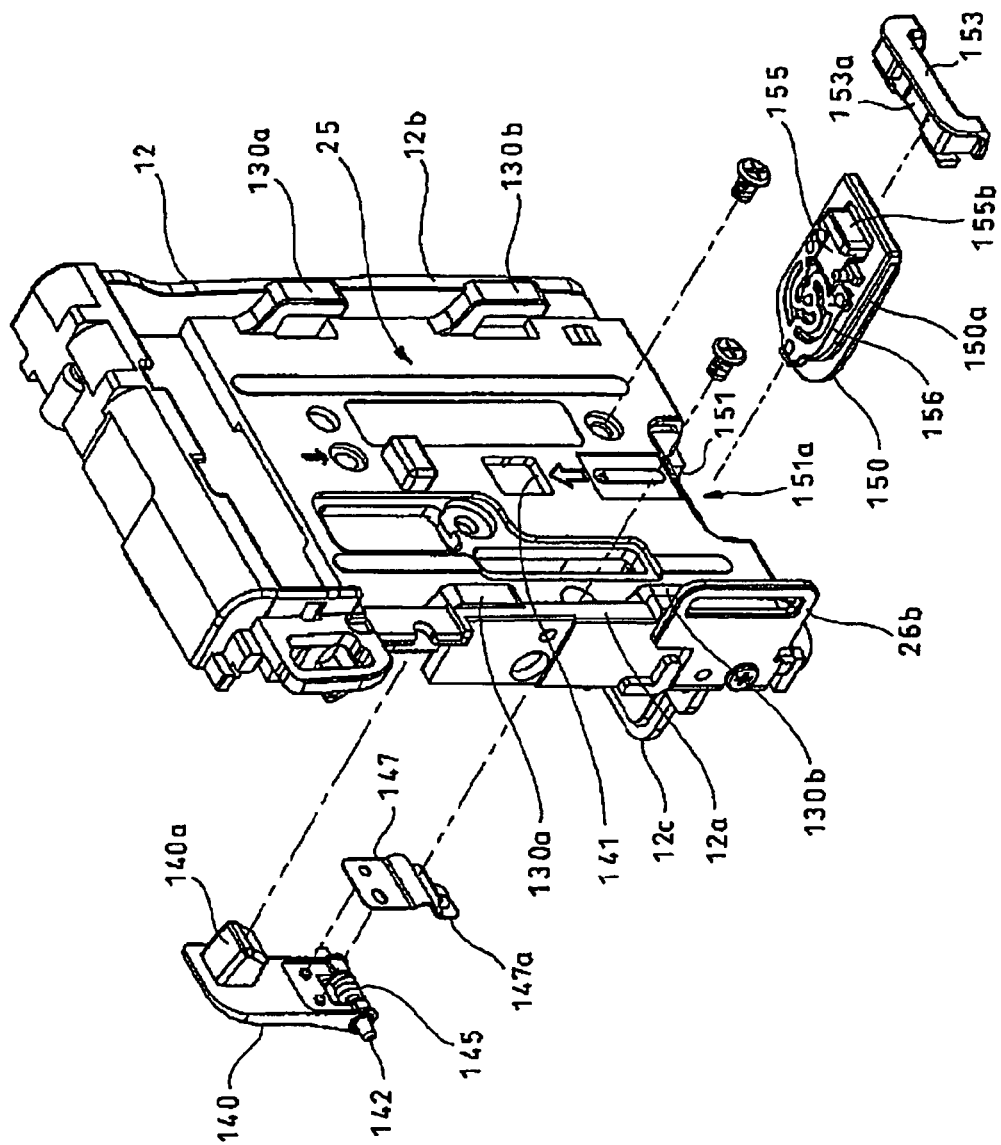
FIG. 14 is an exploded perspective view of the battery locking mechanism.
Figure 15:
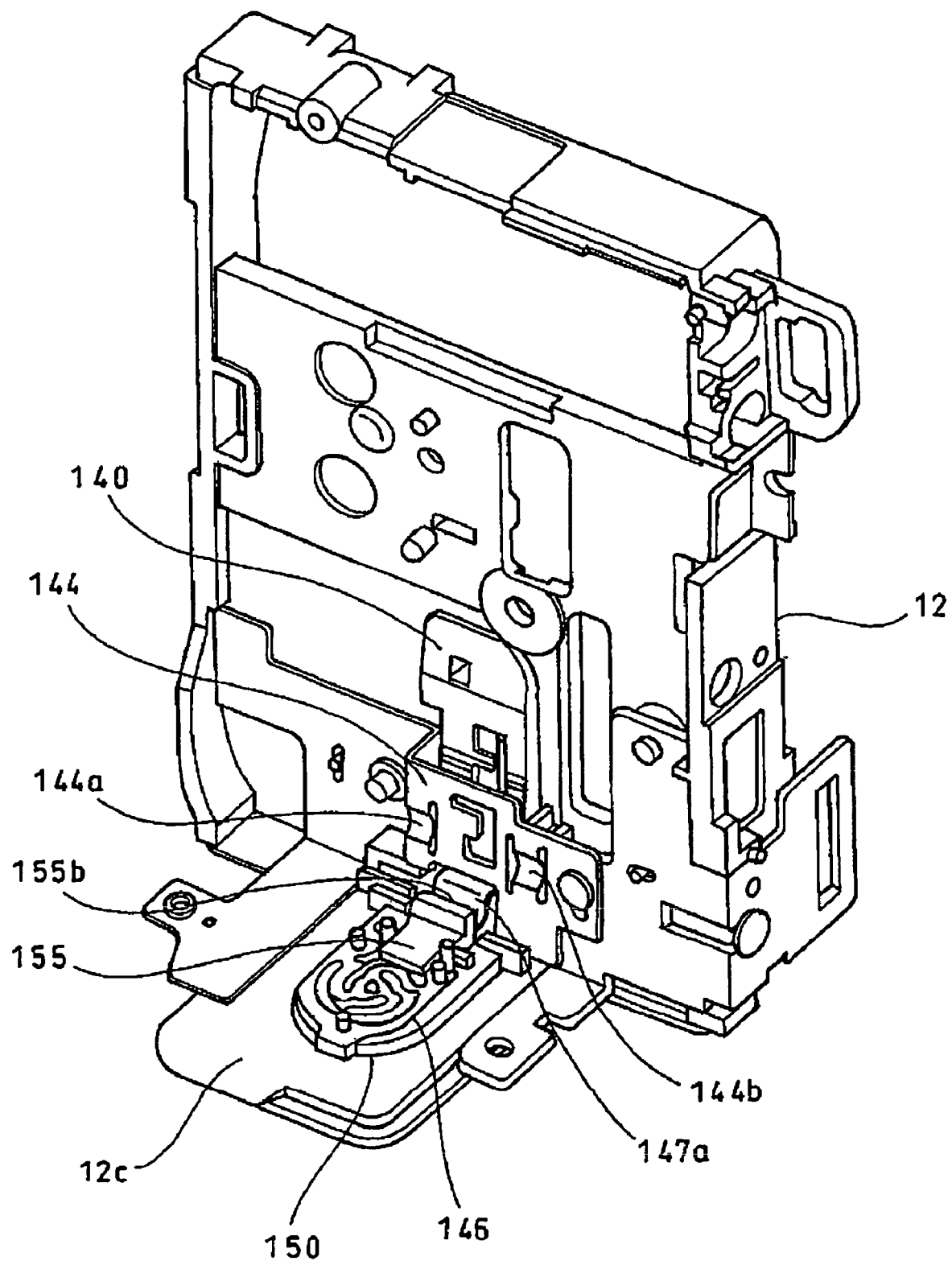
FIG. 15 is a perspective view of the battery locking mechanism as viewed from the rear surface side.
Figure 16:
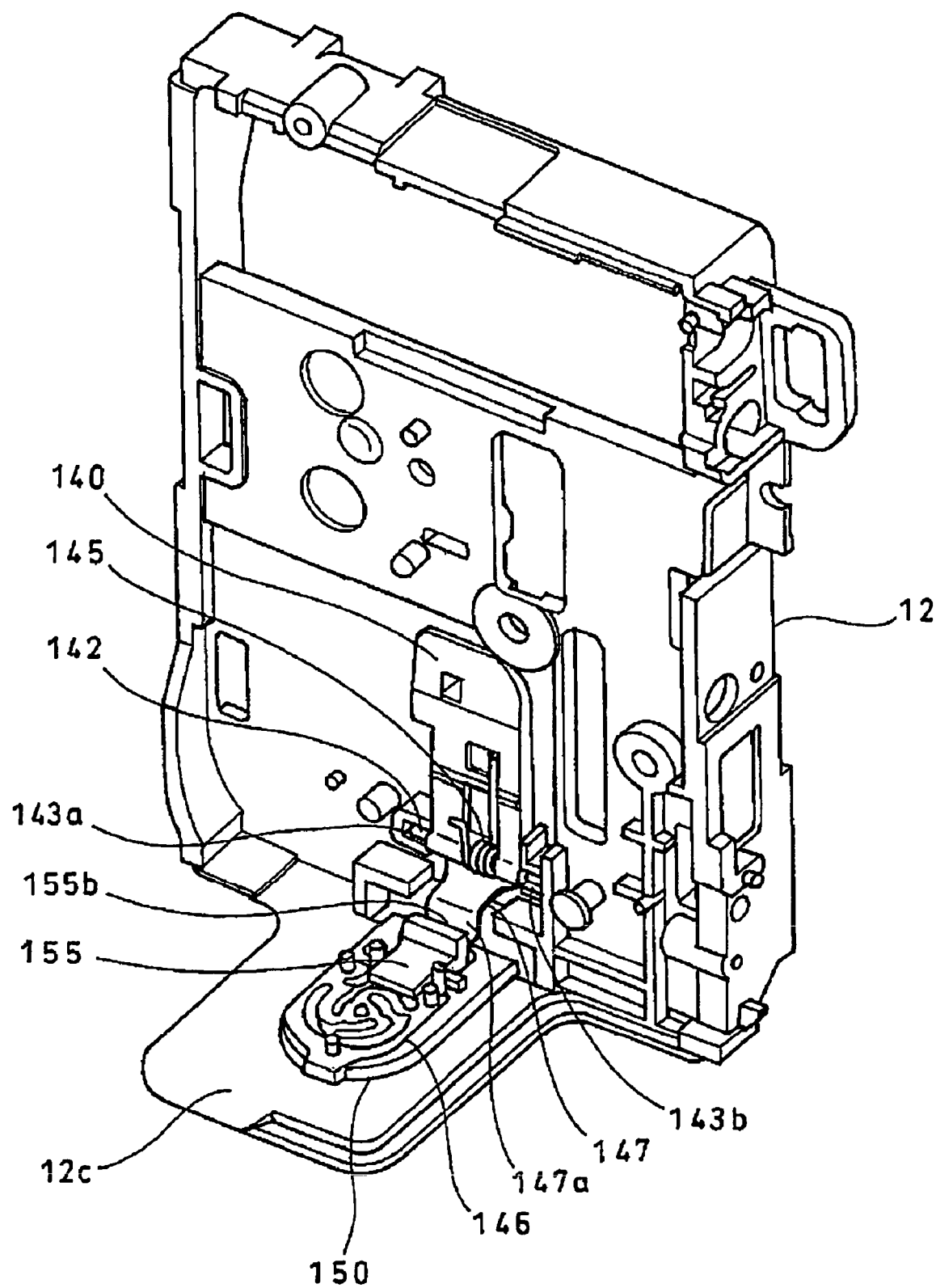
FIG. 16 is a perspective view of the battery locking mechanism with a holding plate removed in FIG. 15.
Figure 17:
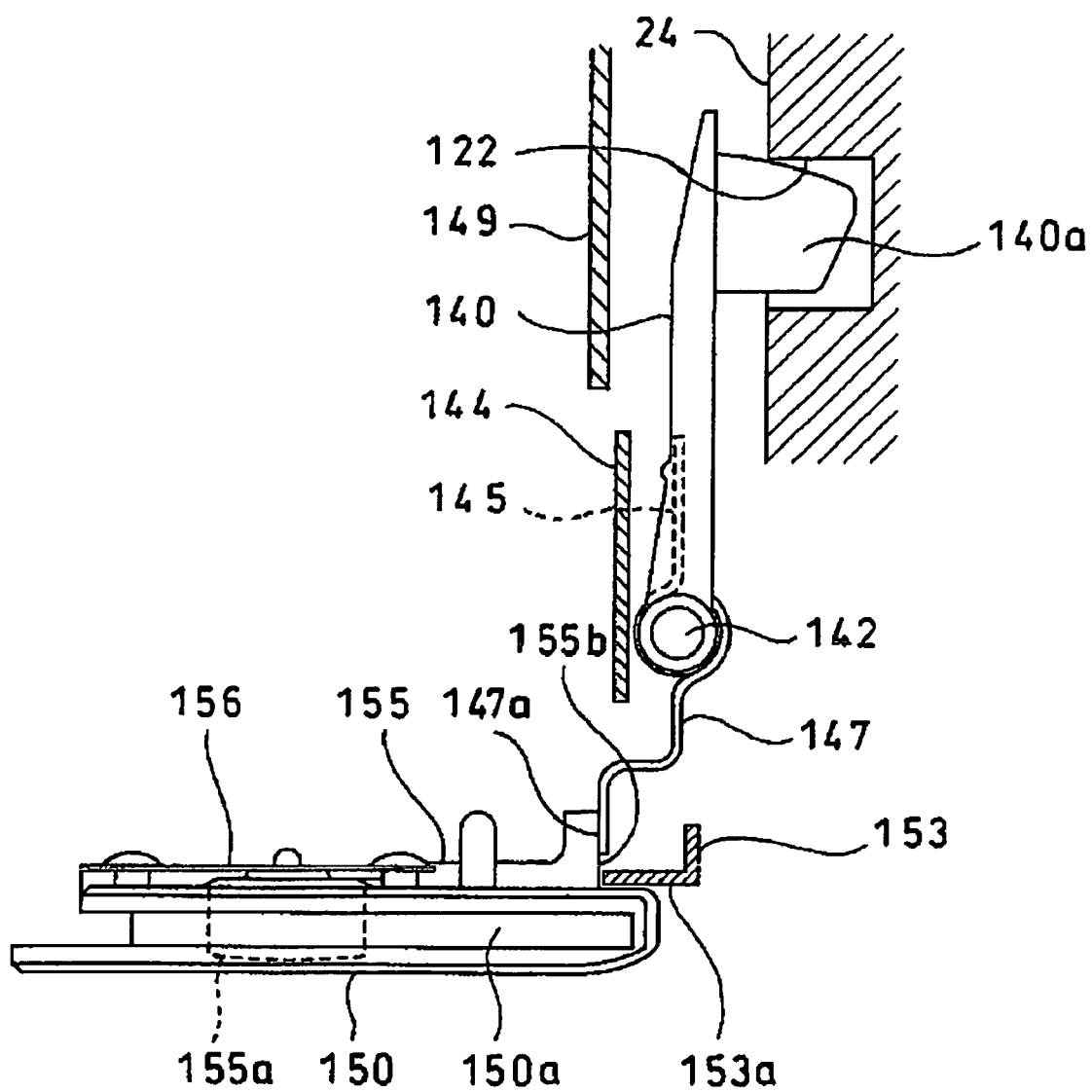
FIG. 17 is an explanatory view of a battery unlocking operation and illustrates a battery locking state.
Figure 18:
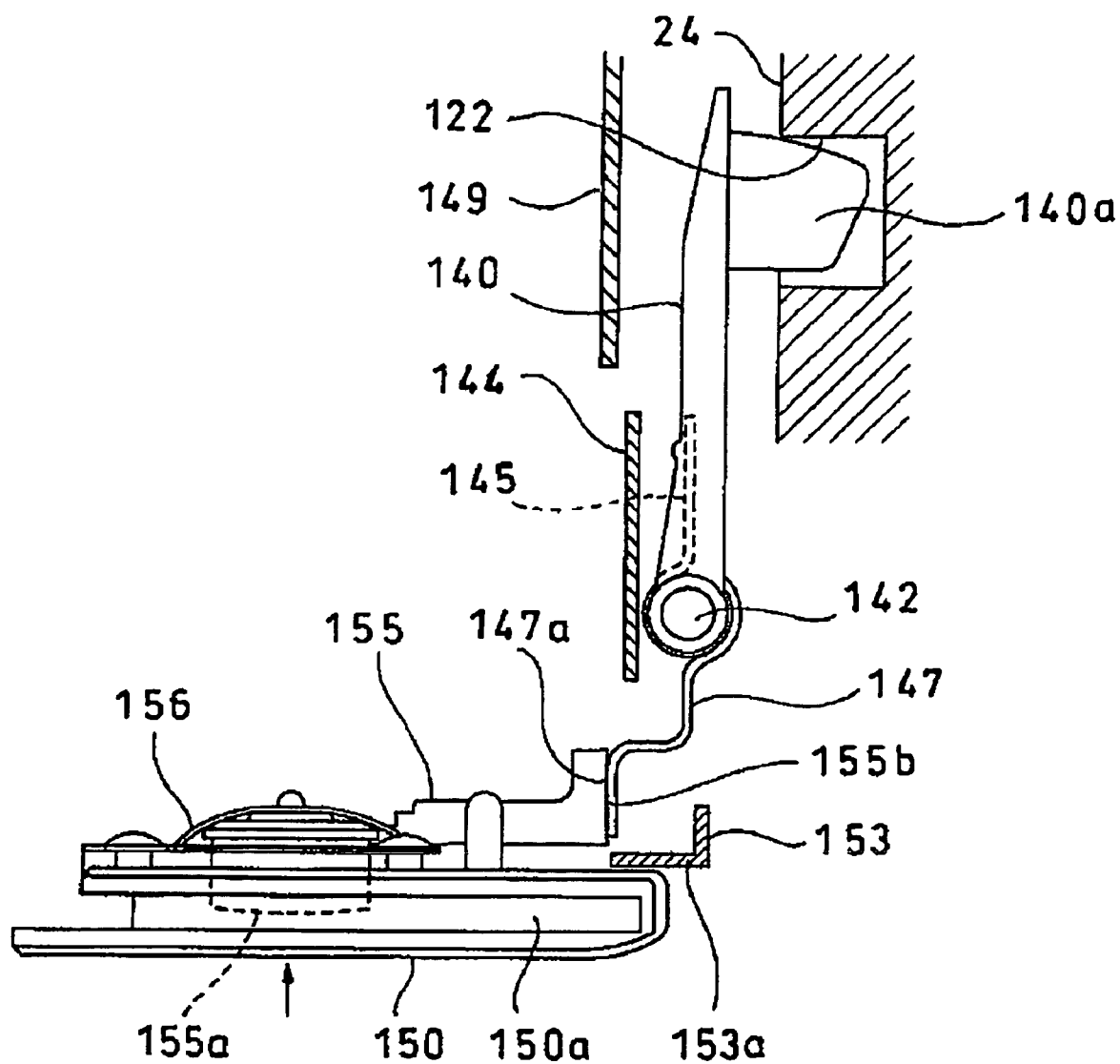
FIG. 18 is an explanatory view of the battery unlocking operation and illustrates a state wherein a slide lock of an unlocking member is released.
Figure 19:
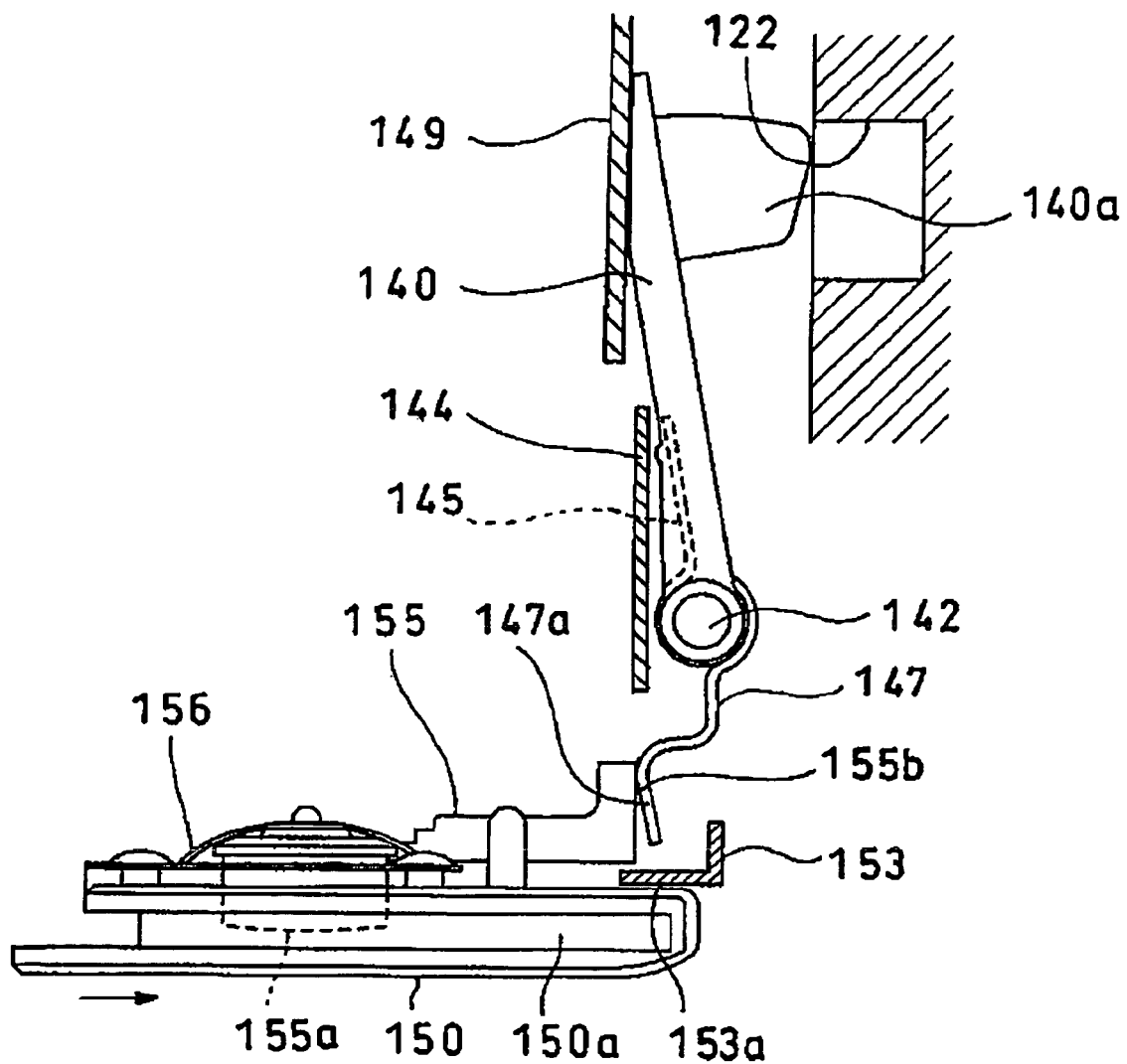
FIG. 19 is an explanatory view of the battery unlocking operation and illustrates a state wherein the battery locking is released.

Now, the battery locking mechanism which is essential part of the present invention is described with reference to FIG. 11 et seq. FIG. 11 is a perspective view of the image pickup apparatus with the battery removed as viewed from the back surface side; FIG. 12 is a perspective view of the image pickup apparatus in a horizontal lying state with the battery removed as viewed from the bottom surface side; FIG. 13 is a perspective view of the battery locking mechanism as viewed from below; FIG. 14 is an exploded perspective view of the battery locking mechanism; FIG. 15 is a perspective view of the battery locking mechanism as viewed from the rear surface side; FIG. 16 is a perspective view of the battery locking mechanism with a holding plate removed in FIG. 15; FIGS. 17 to 19 are explanatory views of a battery unlocking operation; and FIG. 20 is a perspective view of the battery.

As shown in FIGS. 11 and 12, the battery 24 is removably mounted on the battery mounting section 25 provided on the back surface side of the image pickup apparatus 1. The battery mounting section 25 is provided on the battery mounting panel 12 which forms part of the outer case 5 on the back surface side of the image pickup apparatus 1.

Figure 20:
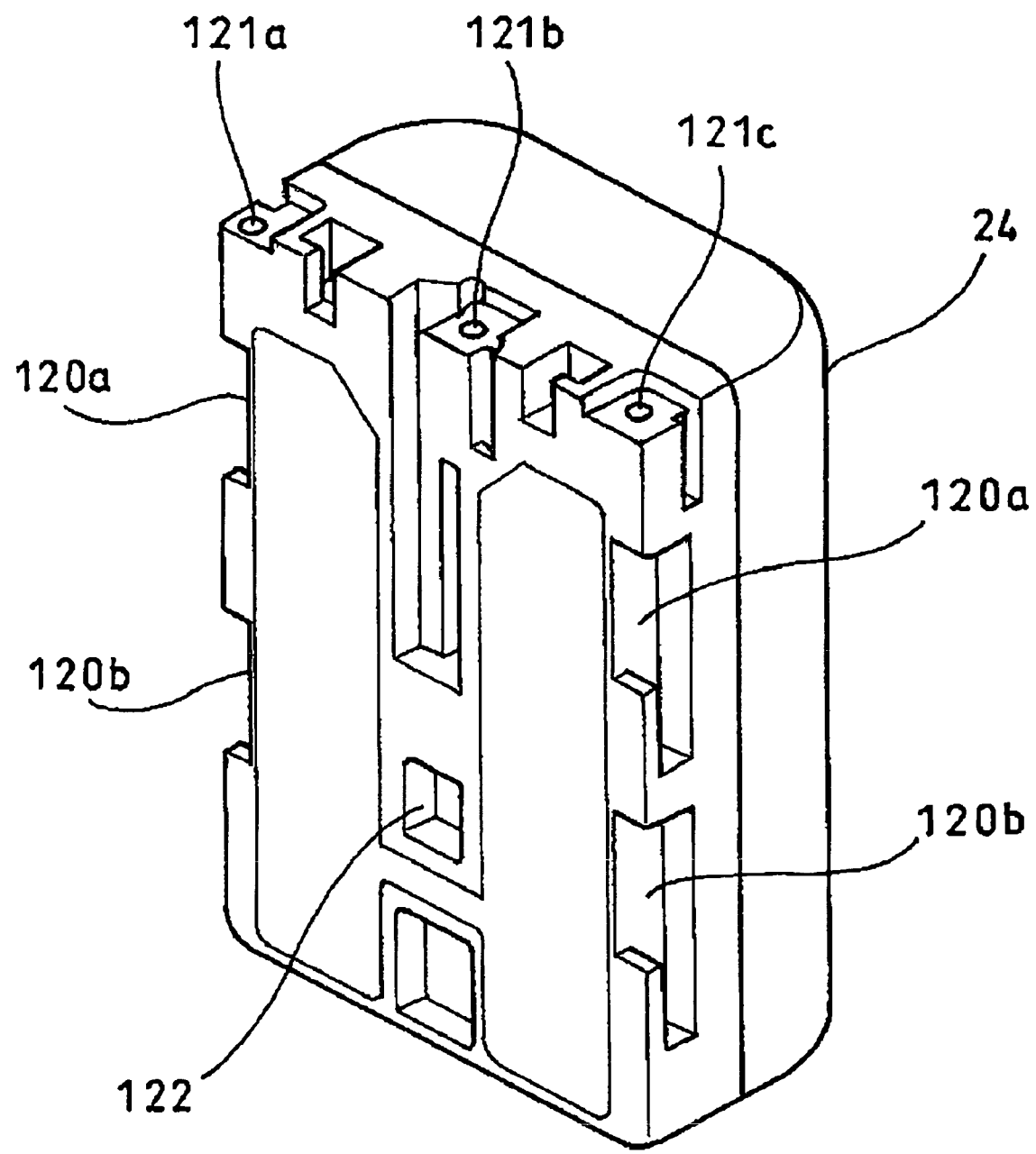
FIG. 20 is a perspective view of the battery.

As shown in FIG. 20, two elongated grooves 120a and 120b are formed at different upper and lower locations on the opposite left and right side portions of the battery 24. On the other hand, engaging portions 130a and 130b are formed in a projecting manner on the inner surface sides of the opposite side wall portions 12a and 12b of the battery mounting panel 12 as seen in FIGS. 13 and 14, and the battery 24 is fixedly held on the battery mounting section 25 through engagement of the elongated grooves 120a and 120b with the engaging portions 130a and 130b. As shown in FIG. 20, the elongated grooves 120a and 120b of the battery 24 are open at upper halves thereof to the front surface, and when the battery 24 is to be mounted, the elongated grooves 120a and 120b are engaged from the opening portions with the engaging portions 130a and 130b of the battery mounting panel 12, and in this state, the battery 24 is moved upwardly along the battery mounting section 25 until the elongated grooves 120a and 120b are engaged fully with the engaging portions 130a and 130b.

In the battery 24 mounted on the battery mounting section 25 in this manner, terminal portions 121a, 121b and 121c (refer to FIG. 20) formed on an upper end surface of the battery 24 contact with terminal portions 131a, 131b and 131c (refer to FIG. 12) of the image pickup apparatus side provided above the battery mounting section 25 to supply driving power to the image pickup apparatus 1.

Further, the battery locking mechanism for locking the battery 24 in a state wherein the battery 24 is mounted on the battery mounting section 25 in this manner and releasing the locking is provided on the battery mounting panel 12. The battery locking mechanism includes a locking member 140 for engaging with and locking the battery 24 mounted on the battery mounting section 25, and an unlocking member 150 for releasing the locking of the battery by the locking member 140. Particularly in the battery locking mechanism of the present example, the locking member 140 and the unlocking member 150 are disposed in an L shape.

As shown in FIGS. 14 to 16, the locking member 140 is formed from a part in the form of a plate disposed for sliding movement along the rear surface side of the battery mounting panel 12. An engaging element 140a is provided at an upper end portion of the locking member 140, and this engaging element 140a is projected from a through-hole 141 to the surface side, that is, the battery mounting surface side, of the battery mounting panel 12.

The locking member 140 is attached for pivotal motion in directions in which it moves toward and away from the battery mounting panel 12 by fitting a support shaft 142 into a lower end portion of the locking member 140 and inserting the opposite ends of the support shaft 142 into bearing recesses 143a and 143b provided on the rear surface side of the battery mounting panel 12. The support shaft 142 is held by holding down portions 144a and 144b of a holding plate 144 screwed to the battery mounting panel 12 in a state wherein they are inserted in the bearing recesses 143a and 143b such that the support shaft 142 may not be removed from the bearing recesses 143a and 143b.

Furthermore, a torsion coil spring 145 which is a return spring is mounted between the locking member 140 and the holding plate 144 on the support shaft 142 at a lower end portion of the locking member 140. By the resilient force of the torsion coil spring 145, the locking member 140 is always biased so that the locking member 140 contacts by pressure bonding with the rear surface side of the battery mounting panel 12 and the engaging element 140a projects from the through-hole 141. It is to be noted that, as shown in FIG. 19, a metal plate 149 of an internal structure section such as the mechanism chassis serves as a stopper for the locking member 140 such that, even if it is tried to compulsorily push in the locking member 140 in the direction opposite to the biasing direction by the torsion coil spring 145, it is stopped by the metal plate 149 and cannot be pushed any more.

According to the configuration described above, in a state wherein the battery 24 is mounted on the battery mounting section 25, the engaging element 140a of the locking member 140 engages with a locking recess 122 (refer to FIG. 20) provided on the battery 24. Consequently, the battery 24 is locked against movement so that the elongated grooves 120a and 120b may not be disengaged from the engaging portions 130a and 130b of the battery mounting panel 12.

Meanwhile, the unlocking member 150 is formed from a part in the form of a plate disposed for sliding movement in a direction perpendicular to the battery mounting surface of the battery mounting section 25 on the bottom surface side of the image pickup apparatus 1. As shown in FIG. 13, an extension plate portion 12c projecting from the rear surface side perpendicularly to the battery mounting section 25 is formed integrally at a lower end portion of the battery mounting panel 12. The unlocking member 150 is mounted in an assembly hole 151 formed on the extension plate portion 12c.

As shown in FIG. 14, the assembly hole 151 is open to the battery mounting surface side, and the unlocking member 150 is inserted into and assembled from the opening portion 151a. Here, the unlocking member 150 has side grooves 150a on the opposite side edge faces, and the side grooves 150a are engaged with guide edge portions (not shown in the figure) formed along inner side edges of the assembly hole 151 and assembled for sliding movement. The unlocking member 150 assembled in this manner is held by a stopper member 153 fitted in and secured to the opening portion 151a of the assembly hole 151 so that it is not removed from the assembly hole 151. As shown in FIG. 13, the unlocking member 150 has an operation surface on the lower surface side exposed from the assembly hole 151, and a recessed portion 150b for easily holding by a finger upon sliding operation is formed on the operation surface.

Further, the unlocking member 150 carries a slide lock member 155 for restricting the sliding movement. The slide lock member 155 is assembled for upward and downward movement on the unlocking member 150 and has a button portion 155a integrally provided on one end side thereof, and the button portion 155a projects to the recessed portion 150b of the operation surface from the through-hole 150c of the unlocking member 150. Further, the slide lock member 155 is always biased by a gimbal spring 156, which is a return spring attached between the slide lock member 155 and the unlocking member 150 above the button portion 155a, in a downward direction, that is, in a direction in which the button portion 155a contacts under pressure with the unlocking member 150. Thus, the slide locking mechanism is formed from an end surface 155*b* of the slide lock member 155 and a corresponding receiving plate portion 153*a* of the stopper member 153.

Corresponding to the unlocking member 150 on which the slide lock member 155 is carried in this manner, a transmission plate 147 for transmitting sliding operation force of the unlocking member 150 to the locking member 140 is secured to the locking member 140. The transmission plate 147 is formed from a flat spring bent in a required shape and extends downwardly of the locking member 140 until it contacts and engages at a lower end portion 147*a* thereof with the end surface 155*b* of the slide lock member 155.

A battery unlocking movement of the battery locking mechanism of the present example having such a configuration described above is described with reference to FIGS. 17 to 19.

FIG. 17 illustrates a battery locking state, and in this stance, the engaging element 140*a* of the locking member 140 is engaged with the locking recess 122 of the battery 24. Consequently, the battery 24 is locked so that it is not removed from the battery mounting section 25.

In this state, even if it is tried to operate the unlocking member 150 to move in the battery unlocking direction, since the end surface 155*b* of the slide lock member 155 carried on the unlocking member 150 is abutted with the receiving plate portion 153*a* of the stopper member 153, the unlocking member 150 cannot be slidably moved. Accordingly, the locking of the battery is not released in error at all.

In order to release the locking of the battery 24 from this state, the unlocking member 150 is slidably moved toward the battery mounting section while the button portion 155*a* of the slide lock member 155 projecting to the operation surface of the unlocking member 150 is pushed.

In particular, if the button portion 155*a* of the slide lock member 155 is pushed first, then the slide lock member 155 moves upwardly while deforming the gimbal spring 156 as seen in FIG. 18. Then at the upwardly moved position, the end surface 155*b* of the slide lock member 155 does not correspond to the receiving plate portion 153*a* of the stopper member 153. Consequently, the slide lock of the unlocking member 150 is released.

Then, if the unlocking member 150 is slidably moved toward the battery mounting section while the button portion 155*a* of the slide lock member 155 is pushed, then the end surface 155*b* of the slide lock member 155 pushes the lower end portion 147*a* of the transmission plate 147 as shown in FIG. 19. Consequently, the sliding operation force of the unlocking member 150 is transmitted to the locking member 140 through the transmission plate 147 to turn the locking member 140 around the support shaft 142 against the force of the torsion coil spring 145, whereupon the engaging element 140*a* is pulled off from the locking recess 122 of the battery 24.

Since the engaging element 140*a* of the locking member 140 is pulled off from the locking recess 122 of the battery 24 in this manner, the locking of the battery 24 is released.

In this battery unlocking operation, the locking member 140 is restricted further movement in the unlocking direction because the metal plate 149 of the internal structure section acts as a stopper as seen in FIG. 19. On the other hand, the unlocking member 150 has a large moving operation stroke which does not coincide with the moving stroke of the locking member 140. Therefore, in the mechanism of the present example, a flat spring is used for the transmission plate 147 for transmitting the operation force of the unlocking member 150 to the locking member 140. Upon battery unlocking movement, the flat spring is yielded to absorb the overstroke of the unlocking member 150 thereby to allow smooth and reliable unlocking operation.

Further, by moving, in the state wherein the locking of the battery 24 is released in such a manner as described above, the battery 24 downwardly along the battery mounting section 25 until the elongated grooves 120*a* and 120*b* are disengaged from the engaging portions 130*a* and 130*b*, the battery 24 can be removed from the battery mounting section 25.

The battery locking mechanism which is configured and operates in such a manner as described above is configured such that, as can be seen apparently from FIGS. 13 to 19, the locking member 140 and the unlocking member 150 are disposed in an L shape. Therefore, the battery locking mechanism is configured in a minimum space, and it is possible to dispose the battery locking mechanism in a small gap between the outer case 5 of the image pickup apparatus 1 and an internal structure section (the mechanism chassis 37 or a circuit board of the disk drive apparatus 3, some other mechanical part or the like). Therefore, the battery locking mechanism can contribute much to further downsizing the electronic apparatus.

Further, since the battery locking mechanism of the present example includes the slide lock member 155 for restricting the sliding movement of the unlocking member 150, the locking of the battery 24 can be prevented from being released in error. Here, where the slide lock member 155 is carried on the unlocking member 150 and besides the gimbal spring 156 is used as a return spring for the slide lock member 155, minimization of the space is achieved, and this is a configuration further advantageous to downsizing the image pickup apparatus.

Further, since the battery locking mechanism of the present example is configured such that the locking member 140 and the unlocking member 150 are assembled to the battery mounting panel 12 which forms part of the outer case 5 of the image pickup apparatus 1, when the image pickup apparatus 1 is to be assembled, by assembling the locking member 140 and the unlocking member 150 to the battery mounting panel 12 in advance and then attaching the battery mounting panel 12 to the outer case 5 of the image pickup apparatus 1, the assemble efficiency can be enhanced.

Figure 21:
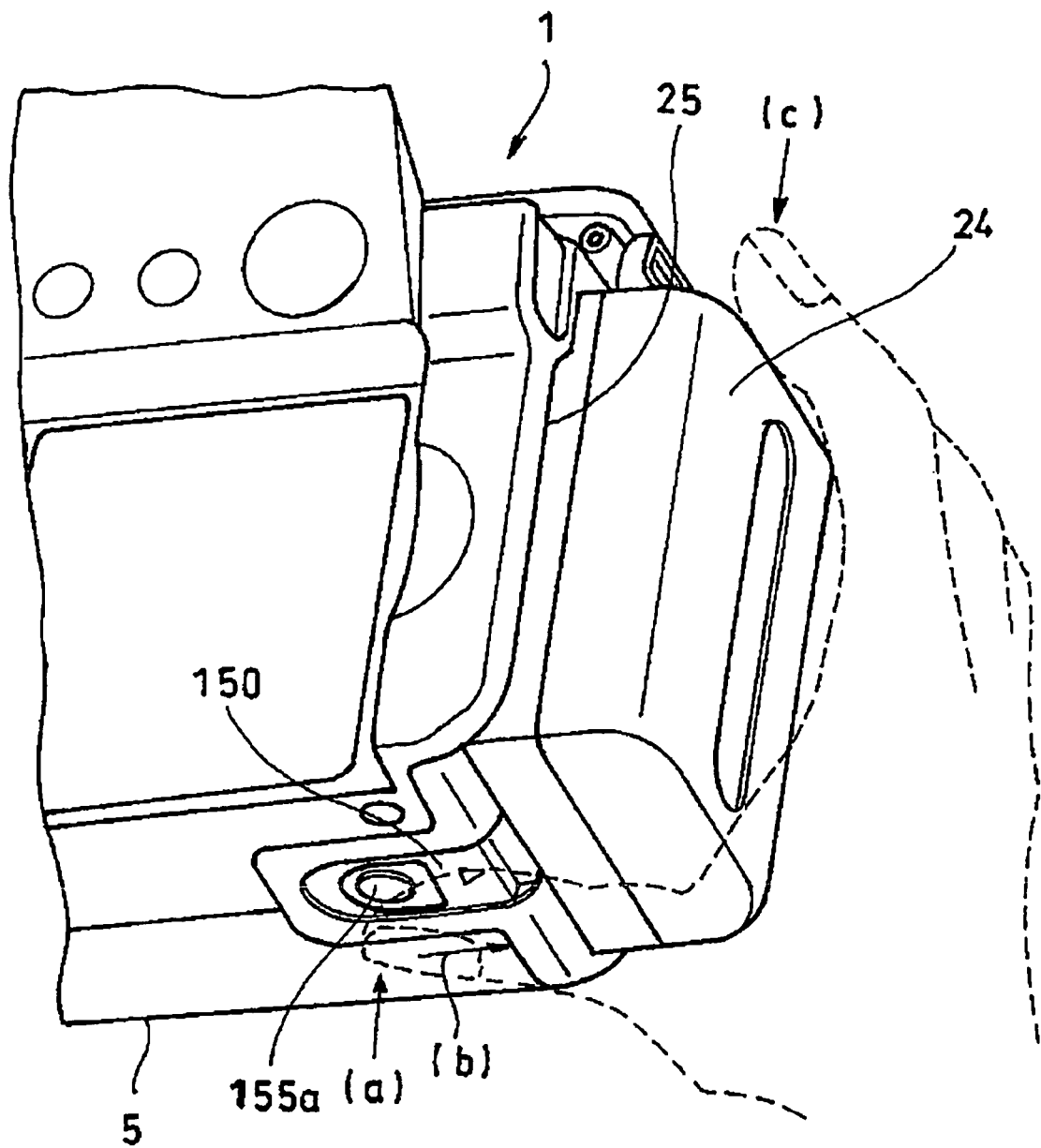
FIG. 21 is an explanatory view of a removing operation of the battery.

Further, according to the battery locking mechanism of the present example, operation for removing the battery can be performed simply with a single hand. In particular, when the battery is to be removed, as seen in FIG. 21, while the battery 24 is held in a gripped fashion with one hand, the button portion 155*a* of the slide locking member is depressed with the thumb (a), and in this state, the unlocking member 150 is operated to slidably move to the battery 24 side (b) to release the locking of the battery 24. Thereafter, the upper surface of the battery 24 is pushed down with a finger on the opposing side to the thumb (c), whereupon the battery 24 is removed and can be gripped naturally in the hand. In this manner, the battery 24 can be removed smoothly through reasonable operation from a point of view of the human engineering.

In this manner, the battery locking mechanism of the present example is a mechanism which allows, when it is intended to remove the battery, the battery to be removed readily while the battery is held by one hand although it is a locking mechanism which does not allow the battery to be removed unless it is intentionally tried to remove the battery. By adopting this mechanism, an image pickup apparatus on which the battery can be mounted with certainty and which is easy to use the battery can be removed simply can be implemented.

INDUSTRIAL APPLICABILITY

The present invention is not limited to the embodiment described hereinabove and shown in the drawings but can be carried out in various modified forms without departing from the spirit and scope of the present invention. For example, while, in the embodiment described above, the present invention is applied to an image pickup apparatus of the disk recording type which uses a DVD as a recording medium, the present invention can be further applied widely to the battery locking mechanism for use with various electronic apparatus such as, for example, an image pickup apparatus of the magnetic tape recording type.

The invention claimed is:

1. A battery locking mechanism for an electronic apparatus, comprising:
   a battery mounting section provided on a back surface side of said electronic apparatus for removably mounting a battery thereon;
   a locking member disposed along an interior surface side of said battery mounting section opposite to an exterior surface side of the battery mounting section upon which the battery is configured to be mounted, the locking member moveable between an engaging position and a disengaging position with the battery, the locking member including an engaging portion configured to project through a battery mounting surface of said battery mounting section for engaging with the battery mounted on said battery mounting section to lock the battery; and
   an unlocking member provided along the interior surface side of the battery mounting section and slidably disposed in a substantially perpendicular direction with respect to a longitudinal axis of the locking member, the unlocking member is configured to move in a first direction to contact said locking member and move the locking member in a second direction, opposite to the first direction, to release the locking of the battery;
   a slide lock member provided within the interior surface side of said battery mounting section, the slide lock member is secured to and slidably disposed with the unlocking member and configured to restrict the sliding movement of said unlocking member,
   wherein said locking member and said unlocking member being disposed in an L shape.

2. The battery locking mechanism for an electronic apparatus according to claim 1, wherein said slide lock member is carried on said unlocking member.

3. The battery locking mechanism for an electronic apparatus according to claim 1, wherein said battery mounting section is provided on a panel which forms part of an outer case of said electronic apparatus, and said locking member and said unlocking member are assembled to said panel.

4. The battery locking mechanism for an electronic apparatus according to claim 1, wherein the contact from the unlocking member causes a rotational movement of the locking member to release the battery.

5. The battery locking mechanism for an electronic apparatus according to claim 4, wherein the locking member and the unlocking member remain in contact after the battery has been released.

6. The battery locking mechanism for an electronic apparatus according to claim 2, wherein the sliding lock member and unlocking member are configured to be raised to facilitate a release of the battery.

7. The battery locking mechanism for an electronic apparatus according to claim 1, wherein the sliding lock member is located along a rear surface side of said battery mounting section.

* * * * *